(12) United States Patent
Lerman

(10) Patent No.: US 12,737,159 B2
(45) Date of Patent: Sep. 15, 2026

(54) DATA SCIENCE WORKFLOW EXECUTION PLATFORM WITH AUTOMATICALLY MANAGED CODE AND GRAPH-BASED DATA JOB MANAGEMENT

(71) Applicant: EXPLORATORY SCIENCES, INC., Wilmington, DE (US)

(72) Inventor: Abraham Naim Lerman, Denver, CO (US)

(73) Assignee: Exploratory Sciences, Inc., Wilmington, DE (US)

( * ) Notice: Subject to any disclaimer, the term of this patent is extended or adjusted under 35 U.S.C. 154(b) by 97 days.

(21) Appl. No.: 17/979,833

(22) Filed: Nov. 3, 2022

(65) Prior Publication Data

US 2023/0108808 A1 Apr. 6, 2023

Related U.S. Application Data

(63) Continuation-in-part of application No. PCT/US2021/030114, filed on Apr. 30, 2021.

(Continued)

(51) Int. Cl.

*G06F 8/35* (2018.01)
*G06F 8/34* (2018.01)
*G06F 8/70* (2018.01)

(52) U.S. Cl.

CPC .................. *G06F 8/35* (2013.01); *G06F 8/34* (2013.01); *G06F 8/70* (2013.01)

(58) Field of Classification Search

CPC ................. G06F 8/34; G06F 8/35; G06F 8/70
See application file for complete search history.

(56) References Cited

U.S. PATENT DOCUMENTS 10,719,301 B1 * 7/2020 Dasgupta .................. G06F 8/34
11,244,249 B2 * 2/2022 Goldfarb ................ G06N 20/10

(Continued)

FOREIGN PATENT DOCUMENTS

EP 1143357 A2 10/2001
KR 10-1588592 B1 2/2016

OTHER PUBLICATIONS

Mccaffrey, James, Microsoft Azure: Introduction to Machine Learning Studio, Microsoft (Jul. 1, 2015) retrieved from https://learn.microsoft.com/en-us/archive/msdn-magazine/2014/september/microsoft-azure-introduction-to-machine-learning-studio on Apr. 12, 2024 (Year: 2015).*

(Continued)

*Primary Examiner* — Lewis A Bullock, Jr.
*Assistant Examiner* — Theodore E Hebert
(74) *Attorney, Agent, or Firm* — Baker Botts L.L.P.

(57) ABSTRACT

In an embodiment, the disclosure provides a special-purpose computer system executing operations that allow drag-and-drop input to perform data science operations using visual and graphically enabled data analysis, engineering, and modeling. Using the visual techniques of the disclosure, computer systems are programmed to support rapid creation of data science models and automatic generation of output program code, such as dynamically generated Python, to implement a data science project. In this manner, business-savvy users who are not programmers can execute the system to parse through their data and make useful decisions based on the data, with a focus toward results interpretation and away from computer programming.

14 Claims, 21 Drawing Sheets

Related U.S. Application Data

(60) Provisional application No. 63/021,464, filed on May 7, 2020.

(56) References Cited

U.S. PATENT DOCUMENTS

| | | | | |
|---|---|---|---|---|
| 11,403,006 | B2 * | 8/2022 | Biswas | G06N 20/00 |
| 11,537,935 | B2 * | 12/2022 | Rugel | G06N 20/00 |
| 2005/0251789 | A1 | 11/2005 | Peck et al. | |
| 2005/0257193 | A1 * | 11/2005 | Falk | G06F 8/315 717/109 |
| 2011/0060704 | A1 * | 3/2011 | Rubin | G06N 5/04 706/12 |
| 2014/0068771 | A1 | 3/2014 | Hsiung et al. | |
| 2015/0317129 | A1 | 11/2015 | Falk et al. | |
| 2018/0137093 | A1 * | 5/2018 | Goldfarb | G06N 20/10 |
| 2020/0183664 | A1 * | 6/2020 | Lee | G06F 8/38 |
| 2020/0285977 | A1 * | 9/2020 | Brebner | G06N 5/022 |
| 2020/0380301 | A1 * | 12/2020 | Siracusa | G06N 20/00 |
| 2021/0042110 | A1 * | 2/2021 | Basyrov | G06N 3/006 |
| 2021/0110288 | A1 * | 4/2021 | Poothiyot | G06F 8/20 |
| 2023/0108808 | A1 * | 4/2023 | Lerman | G06N 5/01 717/104 |

OTHER PUBLICATIONS

McKerns, Mike, Serialize a python function with dependencies, Stackoverflow.com (Oct. 15, 2014) retrieved from https://stackoverflow.com/questions/26389981/serialize-a-python-function-with-dependencies on Aug. 23, 2025 (Year: 2014).*

International Searching Authority, International Search Report and Written Opinion for International Application No. PCT/US2021/030114, Mailed Aug. 5, 2021, 7 Pages.

Hoisl, Bernhard, Supplemental Partial European Search Report; For International Application No. PCT/US2021/030114, Published by: European Patent Office, mailed Apr. 29, 2024, Munich, Germany, 12 pages.

Keith, Mark, "Azure Machine Learning Studio: Introduction to prediction," Sep. 22, 2017, XP093153413, Retrieved from the Internet: https://www.youtube.com/watch?v=NQjYflhlPgk _channel= MarkKeith, time scale: 0:01 *0:05-0:14 * 0:20 *2:27 *3:24-13:17 13:57 * 14:27 * 15:34 * 16:45 * 17:29-17:36, retrieved on Apr. 18, 2024, 2 pages.

Hoisl, Bernhard, Extended European Search Report for International Application No. PCT/US2021/030114, Published by: European Patent Office, mailed Jul. 22, 2024, Munich, Germany, 10 pages.

Xu Qiang, Written Opinion for Singapore Application No. 11202254736P, dated May 27, 2025, 7 pages, The Intellectual Property Office of Singapore, Singapore.

Savin, Daniela, Office Action for Canadian Application No. 3176677, dated Apr. 27, 2026, 4 pages, Canadian Intellectual Property Office, Gatineau, Quebec.

* cited by examiner

Packaging Logic 103

| Edge Type ("Style") Name | Inputs | Outputs |
| --- | --- | --- |
| Generate | None | One or Many |
| Apply | One | One |
| ApplyMany | Many | One |
| Broadcast | One | Many |
| Map | Many | Many |
| Filter | Many | One |
| Reduce | Many | One |
| Consume | One or Many | None |

FIG. 1D

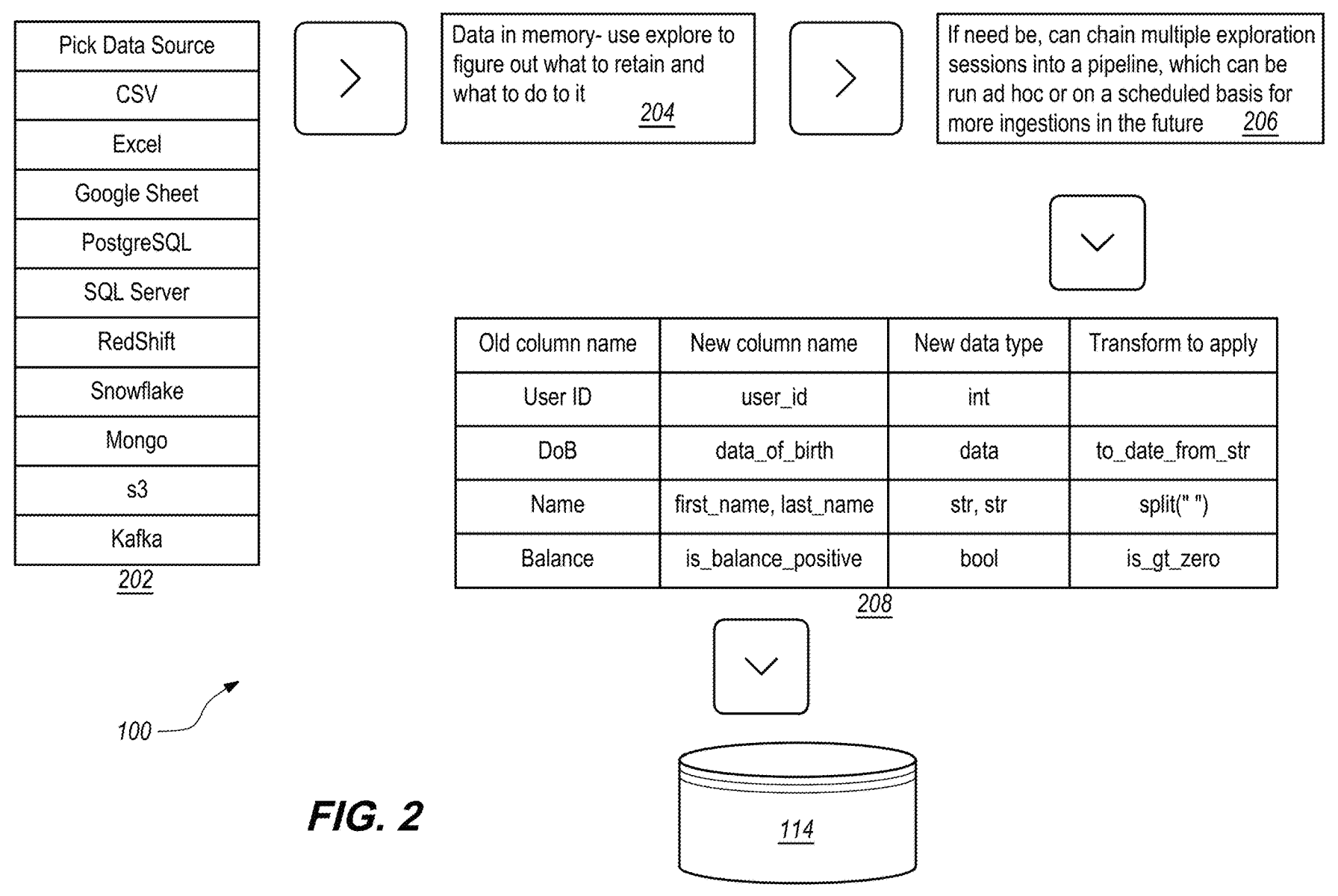

| Old column name | New column name | New data type | Transform to apply |
|---|---|---|---|
| User ID | user_id | int | |
| DoB | data_of_birth | data | to_date_from_str |
| Name | first_name, last_name | str, str | split(" ") |
| Balance | is_balance_positive | bool | is_gt_zero |

FIG. 2

FIG. 11E metaPlay-Test / abe-project (Private)

Figure 11F:
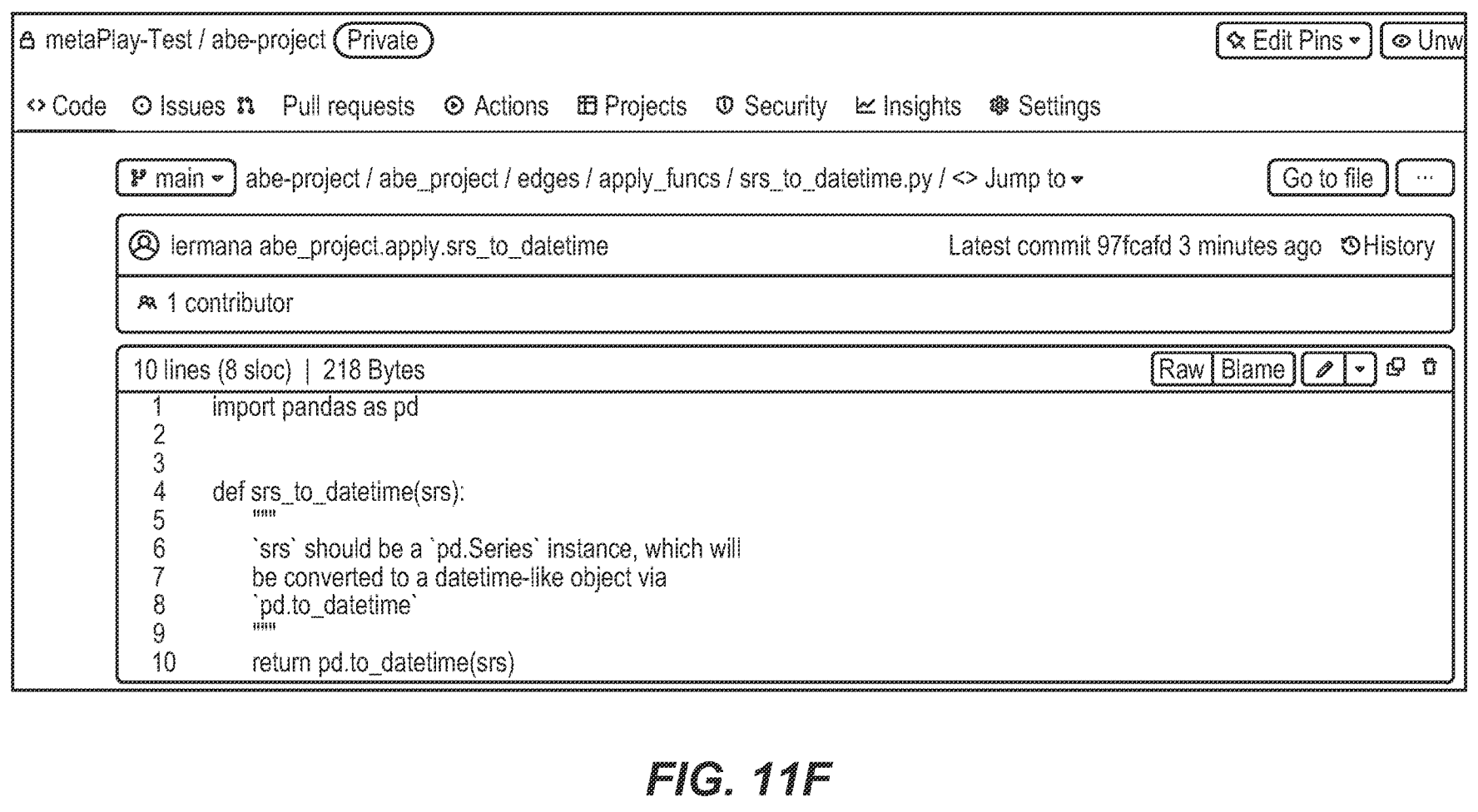

Edit Pins ▾ | Unw

<> Code | Issues | Pull requests | Actions | Projects | Security | Insights | Settings main ▾ abe-project / abe_project / edges / apply_funcs / srs_to_datetime.py / <> Jump to ▾

Go to file | ··· lermana abe_project.apply.srs_to_datetime

Latest commit 97fcafd 3 minutes ago | History 1 contributor 10 lines (8 sloc) | 218 Bytes Raw | Blame

```
import pandas as pd


def srs_to_datetime(srs):
    """
    `srs` should be a `pd.Series` instance, which will
    be converted to a datetime-like object via
    `pd.to_datetime`
    """
    return pd.to_datetime(srs)
```

FIG. 11F metaPlay-Test / abe-project (Private)

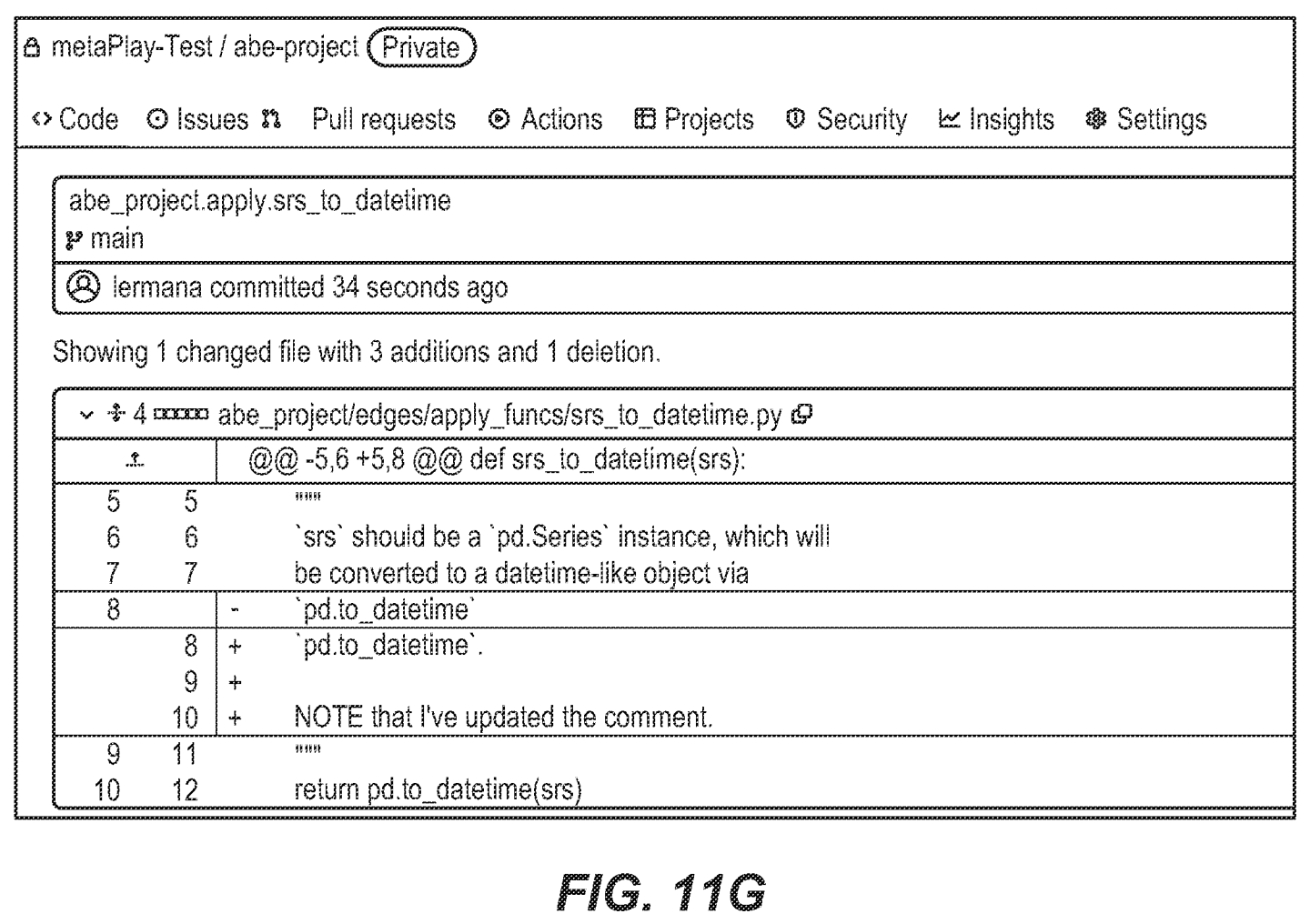

Code | Issues | Pull requests | Actions | Projects | Security | Insights | Settings abe_project.apply.srs_to_datetime
main lermana committed 34 seconds ago Showing 1 changed file with 3 additions and 1 deletion.

4 abe_project/edges/apply_funcs/srs_to_datetime.py

```
        @@ -5,6 +5,8 @@ def srs_to_datetime(srs):
5   5        """
6   6        `srs` should be a `pd.Series` instance, which will
7   7        be converted to a datetime-like object via
8      -     `pd.to_datetime`
    8  +     `pd.to_datetime`.
    9  +
    10 +     NOTE that I've updated the comment.
9   11       """
10  12       return pd.to_datetime(srs)
```

FIG. 11G

DATA SCIENCE WORKFLOW EXECUTION PLATFORM WITH AUTOMATICALLY MANAGED CODE AND GRAPH-BASED DATA JOB MANAGEMENT

BENEFIT CLAIM

This application claims the benefit under 35 U.S.C. § 120 as a continuation-in-part of PCT international application PCT/US2021/030114, filed Apr. 30, 2021, which claims the benefit under 35 U.S.C. § 119 of provisional application 63/021,464, filed May 7, 2020, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2019-2020 Exploratory Sciences, Inc.

FIELD OF THE DISCLOSURE

One technical field is computer-implemented data science, artificial intelligence and machine learning, including the creation, training, and validation of machine learning models. Another technical field is the use of meta-language programming constructs to automatically supplement user-defined code and manage push-pull use of source code repositories. Another technical field of the present disclosure is visual computer programming using graphical user interfaces.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Computer implementations of artificial intelligence (AI) and machine learning (ML) have exploded in recent years and found application in a wide variety of practical applications, from agriculture science to restaurant recommendations to drug development. However, a continuing problem in the data science field is efficient development of machine learning models. Traditionally, development of machine learning models has required enterprises to employ highly skilled data scientists with knowledge of complex mathematical and statistical analysis techniques, ML software, feature selection, and model validation.

As AI and ML become deployed more widely, enterprises are seeking ways to democratize data science to permit persons with skill in product development, customer service and other functions to create, evaluate and deploy AI/ML models. Concurrently, the widespread adoption of expressive, interpreted computer programming languages such as Python, which less-technical users can readily learn, has accelerated interest in making ML model development more accessible to larger groups of users who may lack formal data science education, training, or experience. Nevertheless, Python is not trivial, and in a production environment may reveal issues with memory management or other technical issues that are complex to solve. Therefore, Python still poses challenges to those who are operationally strong but lack any programming skills, so development of ML models takes extensive time.

ML users may work in fields as diverse as financial services, pharmaceuticals, agriculture and transportation. Unfortunately, using currently available systems, despite the availability of Python, the development of effective and predictive ML models usually requires a high level of comfort with complex computer programming, mathematics and statistics, as well as the specific industrial field of application. Few individuals have all these skills. Software engineers may create tools that provide poor data analysis, and skilled systems analysts may be unable to program tools to perform data cleaning that is necessary for good ML results or lack enough knowledge of the domain of application. The result is a mix of skill sets seeking to use non-standardized, tools that are heterogeneous across industries, creating a chaotic situation.

Deployment of ML models poses related challenges. Standards for coding production models, evaluating them and deploying them do not exist, are vague or are inconsistent across different systems. Users may need to interact with multiple local systems, cloud systems, cloud-based tools, storage systems, and other systems that are peripheral to data science work. Therefore, deployment of ML models is not always straightforward and can be difficult for many users. For example, existing systems may impose the burden on the user to provide highly specific code in which transformations are difficult to understand, to establish scheduling, error handling, size of data, size of computer and so forth. The overall observability into the system is typically difficult.

SUMMARY

The appended claims may serve as a summary of the invention.

BRIEF DESCRIPTION OF THE DRAWINGS

In the drawings:

FIG. 1D illustrates type metadata associated with data elements for management under programmatic control in one embodiment.

FIG. 2 illustrates a flow diagram of a computer-implemented system for data exploration based upon machine learning at an overall level.

FIG. 11E shows an auto-generated Python-package-compatible directory structure.

FIG. 11F shows user-defined code that is serialized into a ".py" file or Python module, complete with required imports.

FIG. 11G shows the auto-packaging system can make edits into existing repositories and modules, and commit the edits into existing module of existing repository.

DETAILED DESCRIPTION

Figure 1A:
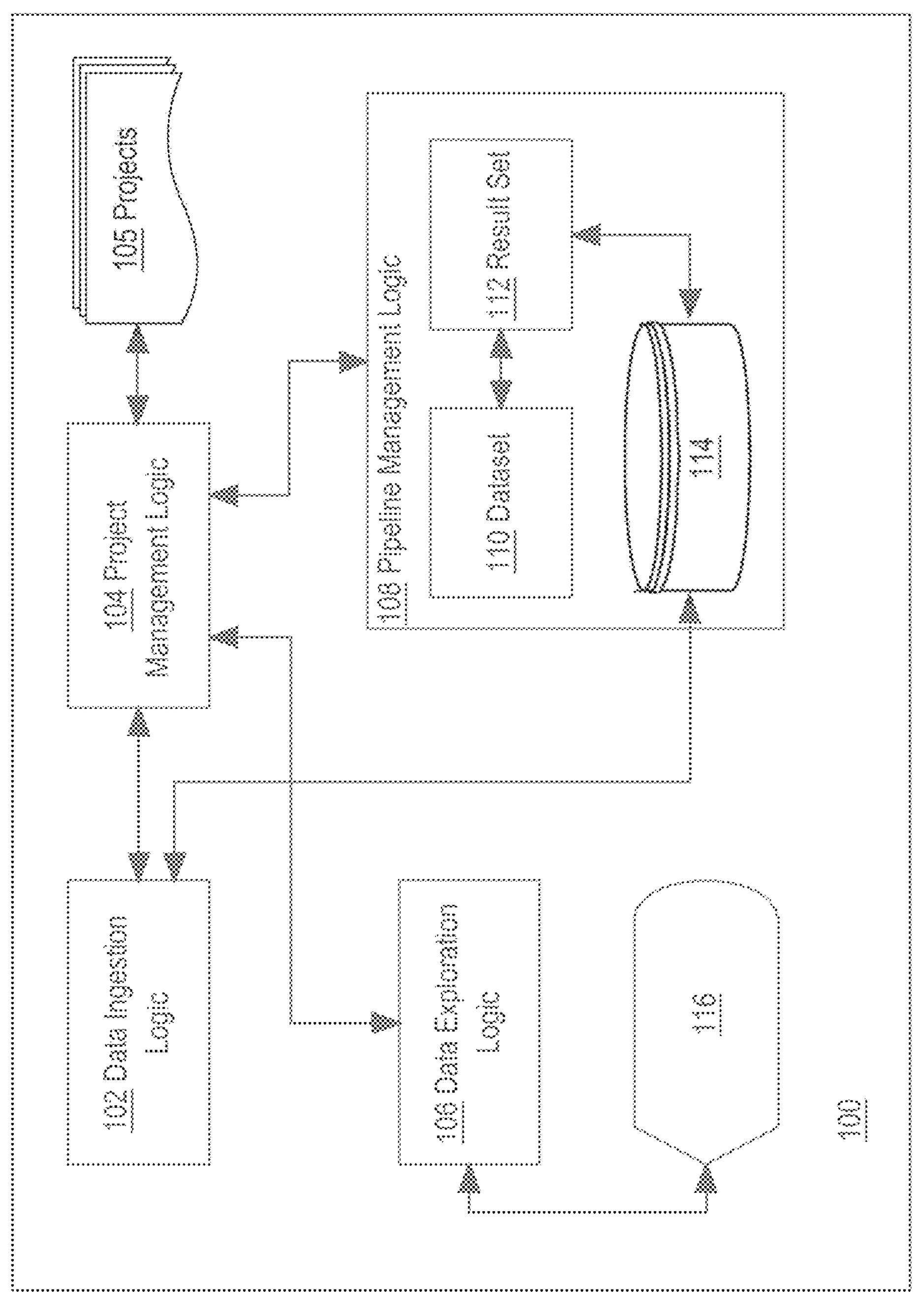
FIG. 1A illustrates a distributed computer system that may be used to implement one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. GENERAL OVERVIEW
2. EXAMPLE IMPLEMENTATIONS OF COMPUTER SYSTEM AND PROGRAM FLOW
  2.1 COMPUTER SYSTEM OVERVIEW
  2.2 DATA EXPLORATION FUNCTIONS
  2.3 VALIDATION OPERATIONS
  2.4 DEPLOYMENT FUNCTIONS AND PIPELINE MANAGEMENT
  2.5 AUTOMATIC GENERATION OF PROGRAM CODE
  2.6 BUSINESS LOGIC OPERATIONALIZATION
  2.7 AUTO PACKAGING OF CODE
3. BENEFITS OF CERTAIN EMBODIMENTS
4. IMPLEMENTATION EXAMPLE—HARDWARE OVERVIEW

1. GENERAL OVERVIEW

In an embodiment, the disclosure provides a programmed computer system implemented via client-server Software as a Service (SaaS) techniques that allow for drag-and-drop data science using visual and graphically enabled data analysis, engineering, and modeling. Using the visual techniques of the disclosure, computer systems are programmed to support rapid creation of data science models and automatic generation of output program code, such as dynamically generated Python, to implement a data science project. In this manner, business-savvy users who are not programmers can execute the system to parse through their data and make useful decisions based on the data, with a focus toward results interpretation and away from computer programming.

Embodiments are programmed to provide functions for model development, validation and deployment. In an embodiment, a distributed computer system is programmed to facilitate execution of ad-hoc analysis and repeatable processes. Ad-hoc analysis entails the pre-processing, transformation, and re-engineering, of available data, with visualization serving to aid in the interpretation of these results. In an embodiment, a distributed computer system is programmed to allow users to engage in fundamental, relational-data analysis via joining, grouping, and other operations using graphical or visual input techniques. For example, a distributed computer system may be programmed to receive input to select column(s) and table(s) or other subsets of data via a drop-down menu or other GUI widgets. Further, in an embodiment, a distributed computer system is programmed to execute log transformations, re-indexing, part-of-speech encodings, and model fitting.

In an embodiment, a computer system according to this disclosure is programmed to allow storing an ad-hoc analysis for future use and integrating the analysis into processes or workflows. A user of the platform may run a number of analysis operations in a specified order. This workflow may be saved, so that other users of the platform can easily execute the same series of operations. Additionally, workflows can be scheduled to run at specified intervals, so that an end-user can plan for results to be available at a certain time.

In an embodiment, visual or graphical actions executed by users trigger the generation of code and the execution of the code in the processing environment. All code that is generated by the disclosed system, whether for an ad-hoc analysis or stored workflow or pipeline, is viewable and exportable.

In an embodiment, the disclosed system is programmed to allow the uploading of custom, user-specific code. For example, a user may wish to a specific transformation that is not previously programmed or available in the system. The user may obtain code from a developer or data scientist who could inject this functionality into the system and make the new code available for other users in the organization to select using visual or graphical input. Users with advanced skills who prefer direct the database connectivity and user experience of the system but wish to use custom code can upload coded functions into the system.

In an embodiment, the disclosed system is programmed to allow for integration with a version-control system to preserve and manage records of changes to the code or revert to previous versions.

In an embodiment, the disclosed system is programmed to connect to and change between one or more database systems for which connections have been established. In an embodiment, the disclosed system is programmed to interoperate with a plurality of different databases. In an embodiment, the disclosed system is programmed to integrate with databases using ANSI SQL and includes code executable to operate with major SQL versions when version-specific syntax is required, for example, for creating tables. In an embodiment, the disclosed system is programmed to accept input of custom database-oriented functionality to increase flexibility of the system.

In an embodiment, the disclosed system is programmed to implement a data storage mechanism for caching of analysis results. This data is exportable into other database systems that are.

In an embodiment, the disclosed system is programmed to implement data access controls, working from the assumption that many organizations will have a variety of data, with different data potentially having its own level of sensitivity. In an embodiment, the disclosed system is programmed to implement IAM abstractions, such as: users, teams, organizations, and accounts. In an embodiment, the disclosed system is programmed to implement permissions for schemas and tables for any of the foregoing abstraction layers. In an embodiment, the disclosed system is programmed to implement IAM policies so that organizations can use the policies that exist for cloud computing providers. In an embodiment, the disclosed system is programmed to integrate with existing Active Directory setups.

In an embodiment, the disclosed system is programmed to implement a plurality of processing environment. In one embodiment, processing environments comprise a behind-the-scenes processing environment and a roll-your-own processing environment. In an embodiment, the disclosed system is programmed to execute a behind-the-scenes processing environment in which the disclosed system manages execution of all code. As an example, the disclosed system is programmed to instantiate Python processes with appropriate libraries. For bigger datasets, the disclosed system offers Spark or Flink functionality.

When the roll-your-own processing environment is selected, the disclosed system is programmed to allow users to connect their own processing environment, thus relying on the interface, visualization, database access, and account-management functionalities of the disclosed system.

In some embodiments, the disclosed system may be implemented as an installable application that can execute within private data centers or as a desktop application.

Embodiments comprise a system capable of Comprehensive and Automated Supervised Learning (CASL). Such a CASL system may drastically reduce time and error involved in developing machine learning solutions and providing deep and flexible analysis capabilities to non-programmers.

2. EXAMPLE IMPLEMENTATIONS OF COMPUTER SYSTEM AND PROGRAM FLOW

2.1 Computer System Overview

In one embodiment, the present disclosure provides techniques to enable computer users to create machine learning models, explore the results that an ML model generates based on training data, modify the ML model, and deploy the model using visual, computer-implemented tools. In an embodiment, interactive ML development tools that operate using graphical user interfaces (GUIs) can allow users to focus more on the ideas underlying a data model and less on the mechanics of forming the model. Furthermore, embodiments may be programmed to focus the user on the design of data processing pipelines or workflows, while masking the need to directly interact with program code, and providing the automatic generation and output of such program code as may be necessary for deployment with existing ML evaluation, validation or execution systems. In some embodiments, users interact with a standardized environment for scheduling, deploying and operating ML models or jobs as production entities.

Figure 1B:
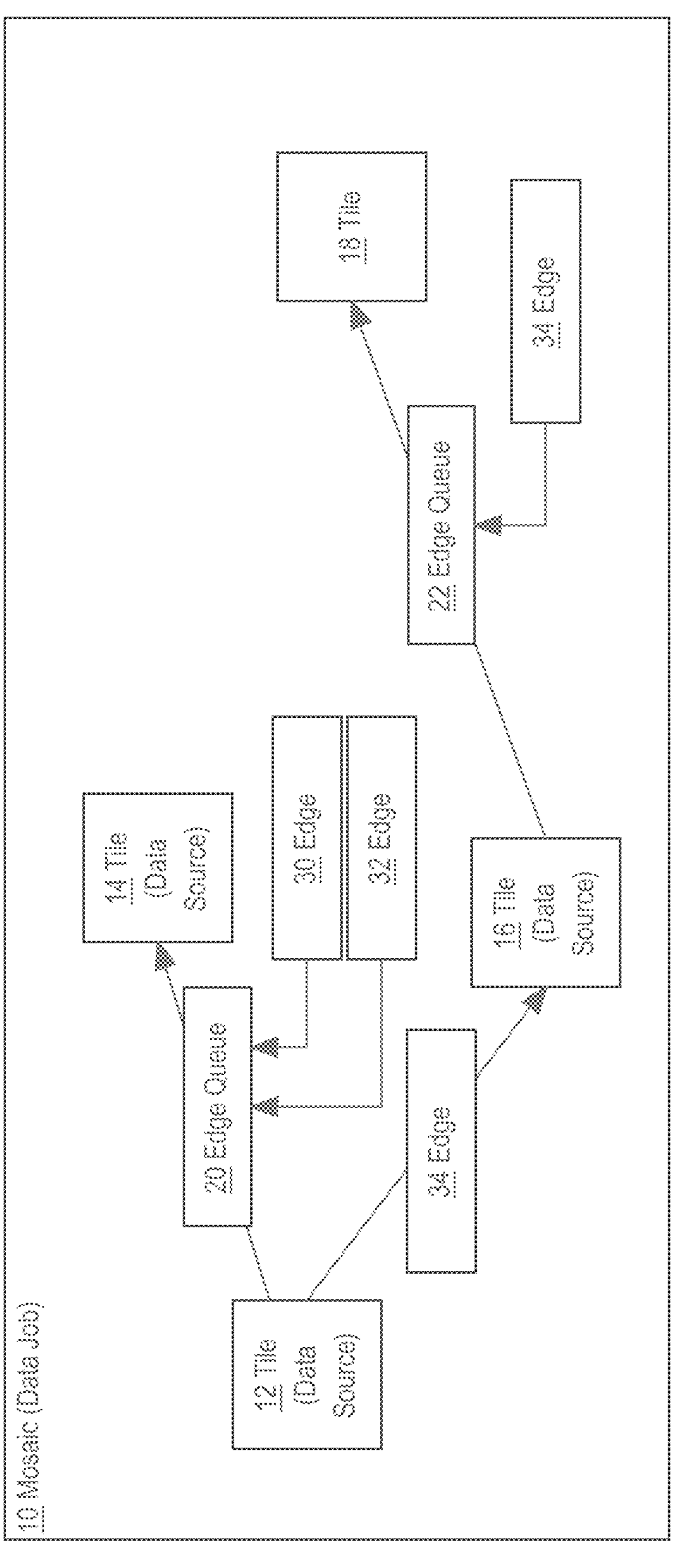
FIG. 1B illustrates data elements that may be created and managed under programmatic control to implement one embodiment.

FIG. 1B illustrates data elements that may be created and managed under programmatic control to implement one embodiment. FIG. 1B, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, an online distributed computer system or platform for data science provides an interactive development environment based on programmatically creating and supporting user interaction with digital electronic notebooks. In some embodiments, each notebook is created and stored using the JUPYTER notebook code base with modifications to support the functionality that is further described herein. In an embodiment, the platform comprises a data sharing layer that facilitates exchanging data among a plurality of notebooks. The data sharing layer is programmed, in various embodiments, to receive data structures that have been defined in PYTHON or another programming languages and transfer the data structures into the data sharing layer with accompanying metadata.

In addition to data, functionality is defined by the user in a JUPYTER notebook and automatically propagated to a connected GIT repository; code in the GIT repository can be automatically re-introduced into a notebook. Thus, in an embodiment, a user may write a function, and in response, the platform automatically executes a closure layer that adds decorator or annotation code to the user function. In this manner, user-defined functions are automatically captured and supplemented with decorator or annotation code that implements system functionality that may be executed before or after the user function, or control arguments to the user function. In an embodiment, the system functionality includes connection and propagation to a GIT repository, and connection to other user notebooks.

The system functionality provides the important benefit of automatically integrating version control and source code control into the system without requiring direct user interaction with a different or separate graphical user interface or other tool for management of the GIT repository. Consequently, the user retains the current context and does not have to switch out of the platform to address GIT repository issues. Furthermore, code associated with user functions that users write using a platform of the present disclosure may be passed automatically to a GIT repository that the user has previously established. Moreover, the platform of the present disclosure does not exercise unitary control over the code of the user function, as with certain prior closed systems; instead, the user always maintains control, via their GIT repository outside the platform, of the code of the user functions.

In an embodiment, each user account may be associated with multiple different source code repositories. The repositories may be public in the sense that other user accounts of the platform can view or access code in the repositories, or may be private. The platform may implement permissions that restrict access to a repository to specific user accounts, groups or other permissions constructs. Repositories may be associated with projects, clients, customers or other abstractions, using labels, display names or naming conventions.

In an embodiment of the platform of this disclosure, data sources are termed tiles, and user functions defining data transformations are termed edges. Each tile and edge may be programmatically created and stored in digital computer memory and manipulated under the control of programs that implement the functions described herein. Tiles and edges are programmatically represented using a graph, in which tiles correspond to nodes, and the identity and relationships of tiles and edges may be displayed graphically to users using visual graphs. Furthermore, a graph programmatically organizes and controls the propagation of datasets in data science problems. For example, a first tile may be coupled to an edge, which is coupled in turn to a second tile; in this arrangement, the edge may implement a user function to receive data from the first tile, execute a transformation or change to the dataset of the first time, and provide the resulting data to, or as, the second tile. Embodiments implement a graph traversal and flow execution supervisor that automatically traverses tiles and edges to execute the user functions, produce intermediate datasets and final datasets. A tile may be loaded from, or mapped to, an external database, table, flat file such as a CSV file, or other source.

An edge may implement any desired user function or transformation. An example is normalization of data, computation of a mean or average among the data, execution of a linear regression, or complex machine learning classification functions. An edge may have automatically generated metadata such as name, type and groups with access. An edge retains a function that is associated with it and validation code to check validity of input types. An edge may be defined within the platform, for example by using a graphical user interface to select from available pre-defined data transformations or may be defined using custom code entirely outside the platform, and then selected and imported.

In an embodiment, a meta-edge is programmed to create the edges. In an embodiment, a build edge function and naming function are defined with supporting classes for Apply, Broadcast, Map and Reduce types to execute the creation of edges and establish validation code for input-output relationships. Code for each edge type may have a factory, decorator or annotation that wraps another function and returns a closure which is its unique edge object that is ready to use.

While tiles normally are stored in a high-speed in-memory cache for performance reasons, in an embodiment, each tile is connected to a persistent data storage layer that manages storage of tile data in a back-end database or data repository. Furthermore, each tile is associated with metadata that is automatically maintained and updated in the back-end database as user accounts interact with the tile. Examples of metadata associated with a tile include date of creation, number of records, size of records, memory consumption, data types, number of columns, groups that have received the tile, and unique tile identifier. Tiles may be associated with PANDA data types for PYTHON, for example.

In an embodiment, two or more user functions represented as edges may be chained together in an edge queue. Each edge queue may be programmatically created and stored in digital computer memory and manipulated under the control of programs that implement the functions described herein. Each edge queue may comprise a first-in, first-out queue with additional functionality as now described. Each edge queue comprises entries that reference or contain edges. In an embodiment, each edge may be associated with a different failure callback or failure routine. Furthermore, an edge queue may be associated with a failure callback or failure routine, different from those of any edge.

Each edge queue also is programmed to execute compatibility checks on edges in the edge queue. In an embodiment, the platform is programmed to support four types of edges denoted Apply, Broadcast, Map, and Reduce. Each user function implements a 1:1, 1:many, many:many or many:1 type of mapping; the null type is also supported. For example, the Map type is many:many, receiving two or more tiles as input and producing two or more tiles as output. Reduce is many:1 and receives a collection of tiles but returns a single tile. The Broadcast type is 1:many, and the Apply type is 1:1. Based on these definitions, an edge queue is programmed to conduct compatibility or validity checking to ensure that the type of mapping of a user function that is producing output is compatible with the expected input of a different user function that is receiving input. If incompatibility is detected, an error message may be generated and displayed or provided to a user account to prompt correction of tile-edge relationships. Each edge can define any form of analytical functionality. While tiles are persisted to a back-end database as previously described, in an embodiment, edges have persistent storage in a code repository such as a GIT repository, as further described.

The execution of edge queues, edges and user functions in relation to tiles is organized as a data job that may be denoted a Mosaic. A Mosaic serves to connect data and functions to enable executing useful work. In a Mosaic, each edge is connected to and receives one or more tiles as input, executes the transformation that the user has defined, and produces a tile as output. Each Mosaic may be organized and represented in computer memory as a directed acyclic graph (DAG). In some embodiments, a Mosaic is not acyclic but is implemented as a directed connected graph. With a Mosaic, a user may chain functionality together, starting from a root tile, with output then propagated from edge to edge to other tiles or nodes in the graph. Thus, each Mosaic may be rooted at one or more tiles.

Furthermore, in an embodiment, each data structure in the platform is created and stored in an in-memory form rather than a serialized form. To support sharing among notebooks, the data sharing layer is programmed to transform data structures into a serialized form to support transmission to other notebooks and to support storage in a repository such as GIT. Different objects may have different serialization methods. In an embodiment, PYTHON PANDA objects are serialized using the open-source project PY-ARROW. Other data types may be serialized using other frameworks. For example, an unstructured text document may be serialized as a strong. Edges may be serialized without decorators or annotations for storage in the repository. Edge queues may be serialized as YAML constructs. Each Mosaic may be serialized in the form of a DOCKERFILE.

In an embodiment, each user account is presumed to have at least one source code repository in a system such as GIT. Each repository is established with a Mosaic folder, and within the Mosaic folder, an Edges folder is provided. Each Edges folder is presumed to have four PYTHON modules corresponding to the Apply, Broadcast, Map and Reduce types of edges. Based on this folder organization, and which code the user account has created, the platform can push and pull edge code and edge metadata to and from the correct locations. GIT may be used to inherently reconcile updates over time.

In an embodiment, the platform is programmed to automatically generate and store a SETUP.PY file, which is configured to enable automatic importing of code that has been entered into a repository such as GIT. Using this mechanism, program code may be automatically pulled from the repository before each addition to the code base of the platform, so other user-created code may be created in or pushed to the repository and automatically introduced into the platform. Using PYTHON's editable install option, the platform is programmed to auto-generate a SETUP.PY install file based on all the import operations that are needed for a particular user-defined edge. In an embodiment, each user repository is traversed to identify all edges, and to identify all import operations or statements that are associated with each of the edges. Import statements may be collected from a notebook. Required libraries are de-duplicated and placed in the SETUP.PY file. Using the editable install function of PYTHON, the library's path is made available to the PYTHON process in the notebook, so the current code always is available in the namespace.

While certain embodiments have been described in the context of using the PYTHON programming language and GIT repositories, other languages or repository systems may be used. For example, any programming language that supports the functional equivalent of decorators or annotations may be used, and repositories such as MERCURIAL, GITHUB or BITBUCKET may be used. Furthermore, while JUPYTER notebooks have been mentioned, other embodiments may implement a native graphical user interface for visual programming, as further described.

In an embodiment, the platform is programmed with a messaging queue layer that enables publishing events to different elements of the system. In an embodiment, a listening service is programmed to listen to the messaging queue to identify events that have been published to the queue. Events may specify that a tile, edge, edge queue or Mosaic has been created, updated or accessed. In response to publication of an event, records are logged in a database. In an embodiment, for edges, edge queues or Mosaics, the occurrence of execution also is logged in the database. Furthermore, in an embodiment, when a relationship is established from a tile into an edge, edge to a tile, edge to edge queue, edge queue to a Mosaic, tile out of an edge queue or Mosaic, a record is logged in the database. Based on the foregoing log records, a graph can be formed in memory and visually displayed on a computer display to show the interaction of a user account with jobs, tiles, edge queues, and edges over time. In one embodiment, a visual graph illustrates the complete ecosystem of Mosaics, tiles, edge queues and edges over time. Therefore, for a specified time window and specified user accounts or groups, a user account may receive data indicating when datasets were created, how many times they were updated and by whom, how many times they were accessed and by whom, how many times each served as input to what functionality, how many times each was produced as output by what functionality, and information about which functionality is linked together in each edge queue, and which tile's edge queues are linked together in which Mosaic. Any such display may be time-dependent. In an embodiment, information about ecosystem interactions may be updated in the database log records as interactions occur.

In an embodiment, a Mosaic may be associated with staging configuration parameters that define how and where to store a Mosaic in specified back-end storage. In an embodiment, a Mosaic may execute based upon a trigger, or based upon a stored schedule. Each Mosaic may implement any level of complexity in data science including ingestion, building predictive models and evaluating the predictive models including creating and storing data about performance. A Mosaic may be shared with other user accounts using permissions and groups.

The architecture defined in the preceding sections provides a way to capture a complete data science solution in flexible and rationalized data representation and execution. In an embodiment, the platform acts as a data science application server or runtime to execute a graph of an execution flow for data and functions that have been defined with connections that may be stored in and represented by a graph, while using the inherent meta-programming attributes of decorators, annotations or similar programmatic constructs to surround user-defined functions with system code that supports automatic execution of the complete graph. The architecture accommodates data ingestion, transformation, and visualization. The platform provides flexible connection of data and functionality. The platform integrates both codebase operations and visual programming operations, the latter being further described in other sections herein. This architecture enables users having a variety of skill levels to accomplish functions that correspond to their level of expertise. For example, users who wish to write code in PYTHON or another language for custom purposes may do so; users who prefer to visually assemble transformations, while having programming code automatically created or assembled without involvement in those details, may do so.

In this manner, embodiments provide a distributed, sharable, permission-specific graph that encompasses the entirety of an organization's data science workflow. Each graph is multi-dimensional and persists across time, enabling visualization of how each node and edge in the graph has changed over time. Each node and edge implements metadata for permissions, usage, data sources and changes. Integration to a versioning server, caching system, persistent storage and scheduler is provided. Embodiments thus provide a framework in which users can build their own data science workflow as a graph. The decorators or annotations for edges or edge queues use meta-programming features to alter the standard programming language runtime to obtain user-defined analysis functionality and ingest it into the graph that is their Mosaic data science workflow. Embodiments provide a data science development environment along with a high-level syntax for building a proper data science workflow that exists through the meta-edges and their combinations. The platform effectively uses the meta-programming capabilities of PYTHON or other languages as a way to build graphs of datasets and transformation functions without burdening the user with the details of creating or managing appropriate metadata. Code may be executed for user accounts in a scheduled fashion using defined data relationships; by defining data connections, the platform provides the runtime environment for the code using decorators, annotations, or other meta-programming techniques for implementation. In this manner, the runtime environment automatically determines what code to execute and how, based on inputs, outputs, transformations and scheduling that are user-defined. Embodiments can substantially reduce the amount of direct coding that users must perform to connect data sources to functions and execute them in chains or pipelines. In effect, embodiments, implement a domain-specific language or pattern that support platform execution of code rather than requiring users to specify where and how to run the code.

FIG. 1A illustrates a distributed computer system that may be used to implement one embodiment. In an embodiment, a computer system 100 comprises data ingestion logic 102 coupled to project management logic 104 that is programmed to store project data in persistent storage, as indicated by projects 105. The project management logic 104 also is coupled to data exploration logic 106, which is programmed to output graphical user interface elements to a computer display device 116. The data ingestion logic 102 and project management logic 104 also are coupled to pipeline management logic 108 which is programmed to receive input signals to associate data of sessions or projects in pipelines or workflows as further described in other sections herein. Pipeline management logic 108 manages one or more input datasets 110 and one or more result datasets 112 for persistent storage in a database 114.

In an embodiment, data ingestion logic 102 is programmed to receive input signals specifying networked locations of data files or data sources, to access and read the specified data sources, and to import records from the data sources into memory, the database 114, or networked or cloud data storage such as AMAZON REDSHIFT.

Data exploration logic 106 may be programmed to manage one or more scratchpads or notebooks that can store text, graphics or data associated with training datasets, model parameters and model output, and may be programmed to provide interactive data exploration functions that enable a user to select datasets, data transformations, and model types or parameters, and to view the effect of those selections on output datasets, classification results or other ML output. Examples of output may include charts, samples of output data with inspection of rows and columns, and review of errors.

In an embodiment, project management logic 104 is programmed to receive session data for explorations from data exploration logic 106 and to save the session data, and data transformations represented in it, as a named project among one or more projects 105. Thereafter, one or more transformations, sessions or projects may be chained together in a pipeline using pipeline management logic 108, so that the output of a first transformation becomes input to a second transformation, for an arbitrary number of transformations. Each pipeline may be named and may comprise an ordered set of sessions or projects to run, combined with conditional logic dictating what processing to execute in response to specified success conditions or failure conditions. Pipeline management logic 108 also may be programmed to provide an interface for scheduling jobs and automatically initiating and executing jobs according to a stored schedule.

While certain embodiments are described herein with reference to columns of data, in other embodiments, any subset of a data source may be selected and used, and columnar representation of data is not required.

2.2 Data Exploration Functions for Model Development and Validation

Model development and validation functions are provided in the disclosed embodiments to support the exploratory phase of data science projects. Embodiments specifically incorporate the novel approach that model development may be approached continuously as part of data exploration functions, so that a user configures one set of model development parameters, performs data exploration functions, then iteratively modifies the model development parameters to improve them. Model development functions may be programmed to facilitate configuring or selecting data attributes for use in machine learning models or algorithms. In some embodiments, model development functions are programmed to implement pre-processing functions, for example, to facilitate addressing data quality issues such as missing data or outliers. Model development functions may be programmed to support encoding data to specify discrete categorical values. Model development functions may be programmed to support specifying target data classes in the case of discrete machine learning models, for example, specifying a set of bin values for a continuous variable.

Furthermore, model development and validation functions may be programmed to support fitting a particular model to available data by associating a mapping function with input data, generating output data and visualizing the output data. Mapping functions may be programmed to implement supervised models with labeled data, or unsupervised models without labeled data. In an embodiment, model development functions are programmed to support executing intake of data from a specified source, then comparing and contrasting multiple different models, such as tree-based Boolean logic models, linear models, and neural networks. Based on the view that consistent evaluation should be applied to all such models, in an embodiment, model development functions provide a connection of all different models via the GUI to a prepared set of data so different models can be validated.

In an embodiment, multiple methods of dividing data for training a model and testing the model are supported, including random sampling, rolling validation, and walk forward validation, as described further in other sections. In an embodiment, data exploration logic 106 is programmed to receive input specifying a particular validation approach for each machine learning object that is defined in the system.

In some embodiments, data exploration logic 106 of computer system 100 is programmed to manage data exploration operations by programmatically creating a machine learning object, each machine learning object having as attributes data to define: one or more target transforms 30, functions or predictors; data preprocessing operations; classification bins if appropriate; feature selection specifications; a validation mechanism or suite of validation mechanisms; a reference to a training dataset or test dataset. In an embodiment, machine learning objects also may be associated with recommendations based on stored validation results as specified by the performance attribute of the object, dimensionality, data type makeup, indexing, temporality of the training data attribute. In some embodiments, a machine learning object may be associated with a set of recommendations can be made to the user based on the data that has been input.

In some embodiments, data exploration logic 106 is programmed to implement data leakage detection. Data leakage occurs when training data is seeded with inappropriate features that improve predictive accuracy at the test phase but will not be found in real-world data during production use of a model. Data leakage can occur when public data sources are used and it is not practical to manually inspect the validity of data, so statistical approaches are needed to detect inappropriate features. Time series data may be especially vulnerable to data leakage. For example, in an embodiment, data exploration logic 106 may be programmed to detect that a date value is present in a data source, or that a dataset is short, and to generate and display a notification, warning or suggestion to execute a particular methodology to prevent data leakage in response.

With the availability of multiple sets of validation logic to implement different validation methodologies, in an embodiment, data exploration logic 106 may be programmed to provide benchmarking functions to permit comparing the results of multiple validation methodologies for a particular model. In some embodiments, different response variable or class engineering schemes may be used as part of benchmarking. "Class engineering," in this context, refers to determining, for a class, what variable is to be predicted; whether to bin or re-bin the variable; the number of bins to use; what rule(s) to use to determine boundaries of bins.

In some embodiments, data exploration logic 106 is programmed to implement prediction roll-up in which output data from transformations is programmatically transmitted to a business logic layer to which computer system 100 or its elements are coupled, or to business logic of other systems. In this manner, users may arrange data transformations in terms of a statistical measure having a number of predictions that are effective over different parts of the data. In an embodiment, data exploration logic 106 is programmed to support preserving multiple predictions and the indexes of the data that was predicted for use in future visualizations and also transmitted to other systems. Therefore, data performance metrics become available across multiple systems. In some embodiments, data exploration logic 106 is programmed to implement prediction roll-up using feedback loops so that one or more output columns transmit or roll back data to another index or the same index. In this manner, predictive output can be used to loop back to exploration steps and inform future predictions.

In an embodiment, computer system 100 is programmed to provide heuristic benchmarks such as simple average of the existing data, using the previous value as the next prediction, or returning YES or NO for a classification.

FIG. 2 illustrates a flow diagram of a computer-implemented system for data exploration based upon machine learning at an overall level. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, a distributed computer system 100 is programmed to receive user input to pick a data source. The user input may be visual or graphical, in the form of selection of graphical user interface widgets. In an embodiment, block 202 illustrates examples of data sources that may be selected.

In an embodiment, in response to a selection, data from the specified source 202 is written into memory, as seen in block 204. In an embodiment, the memory referenced in block 204 is main memory of a virtual machine instance of a cloud computing center that implements elements of computer system 100, for networked access using client computers or workstations. For example, computer system 100 may be implemented using a dynamic plurality of virtual machine instances that client computers of end users access using SaaS techniques.

Once data is in memory at block 204, computer system 100 provide programmed data exploration functions to support determining what data to retain, from among all the data that was loaded, and how to transform the data to new data. Block 208 illustrates, for one an embodiment, stored data that associates an old column name from the specified data, a new column name for use in a transformation, a new data type for use in a transformation, and a transform to apply. In an embodiment, computer system 100 is programmed to receive visual or graphical user input to specify the association of valuers in the columns and to store the associations as a basis of executing transformations or pipelines. Furthermore, as shown by block 308, transformations may execute on multiple input columns and may provide join, cross-tabulation or other operations.

As shown by block 206, in an embodiment, computer system 100 is programmed to receive signals specifying to chain multiple exploration sessions into a data pipeline, which can be run "ad hoc" or based upon a specific input signal or scheduled to execute at one or more times that are discrete or recurring. Successively recurring executions can be programmed to reload the data so that newly acquired data is addressed in the subsequent executions.

Figure 3A:
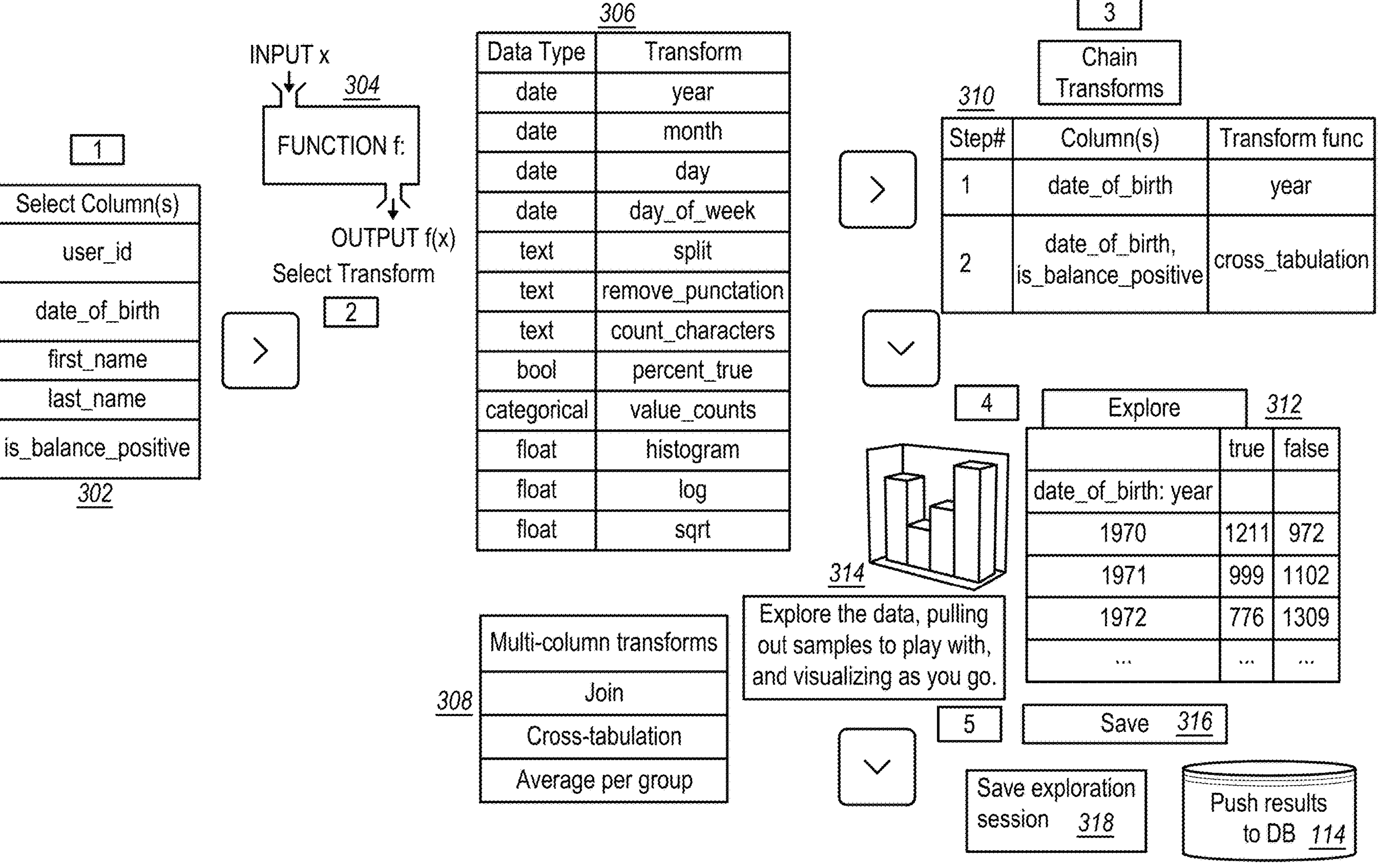
FIG. 3A illustrates data structures, data flows, and functional operations of one embodiment of the data exploration logic of FIG. 1, FIG. 2.

FIG. 3A illustrates data structures, data flows, and functional operations of one embodiment of the data exploration logic.

In an embodiment, data exploration logic 106 implements a plurality of data transformation functions that users may graphically select and associate with or apply to a session or project. In an embodiment, in a first step indicated by reference numeral 1 in FIG. 3A, data exploration logic 106 is programmed to receive selections of one or more columns 302 from a specified data source. For example, data exploration logic 106 may be programmed to generate and visually or graphically display a file browse dialog and receive input signals specifying a particular data file or data source, to open the data file or data source, read metadata describing columns or attributes, and display a dialog that is programmed to accept selections of one or more columns or attributes. While the term "column" is used to illustrate a clear example, in some embodiments, a data source may comprise an unstructured text document that does not have a columnar structure; in such an embodiment, data exploration logic 106 may be programmed to receive input signals specifying a subset of the data.

In an embodiment, data selection logic 106 implements feature selection logic that facilitates selection of specified columns, attributes or values in the dataset that are most predictive of useful output. Feature selection logic may be executed concurrently with selecting columns or values at step 1 of FIG. 3A or selected ad hoc using visual or graphic input to the GUI. In an embodiment, feature selection techniques can be user-defined. In another embodiment, feature selection techniques are programmed to include permutation importance and recursive feature elimination, and to remove redundant features via data-appropriate measures like correlation, Euclidean distance, or cosine similarity. Feature selection may be used, for example, to exclude data from availability for training or test to preserve the independence of variables or other reasons and can substantially improve cross-validation.

In an embodiment, feature selection logic may identify a column (feature) holding information that could prove useful in the context of supervised learning or building a machine learning model in order to make predictions of another column's (target) value. More specifically, useful output may be characterized as estimations of the target's value that meet a certain threshold for a scoring metric, and a useful feature may be characterized as one that improves the likelihood, in estimating the value of a particular target, of achieving a higher value in the scoring metric than would otherwise be achieved.

In an embodiment, in a second step indicated by reference numeral 2 in FIG. 3A, data exploration logic 106 is programmed to receive selections of one or more data transforms. Generically, example transform 304 is programmed to receive an input x, execute a function f: and output the value f(x), and various embodiments may implement any useful transformation functions. Transform 304 may comprise any programmatic function that can be computer-implemented and executes a data transformation that could create new data, better data, or otherwise assist in re-envisioning the problem to be solved. Transform 304 may be programmed to implement a check for missing data, change a label of a column to reflect the sparsity of data in the column, execute a log transformation, square root or other mathematical function. Transforms could map one column to another or combine columns. Transforms also may be termed predictors.

In an embodiment, data selection logic 106 implements skewness reduction logic. For example, in the prediction of a continuous variable, values may have a skewed distribution; the asymmetric distribution of frequency density is the level of skewness in the data. Since many models presume that data is within a certain range, data should be transformed to reduce skewness to improve model performance. In an embodiment, computer system 100 may be programmed with transforms of variables to achieve a reduction in skewness. Example transforms that are programmed in an embodiment include natural log, square root, and cube root transforms. In an embodiment, any such transform may be selected and associated with a continuous target as part of step 2 and using transforms 304.

Table 306 of FIG. 3A illustrates an example library of transforms, correlated to data types of column values, from which transforms could be visually or graphically selected, for example, using drag-and-drop operations.

In an embodiment, at step 3 of FIG. 3A, the selection of transforms for columns can be executed in an explicit order, and the order can be changed by graphically moving transforms in an ordered list or table of transforms. For example, as illustrated by a chain transformation table 310, steps 2, 3 may represent an order of transforms for corresponding columns and transform functions. Based on selecting a transform 304, the selected transform is automatically associated with a project and data source, and automatically applied to the data; column values and records may be stored in tables of database 114 to implement these automatic associations. Consequently, output data after transformations can be structured to be far more valuable than the input data.

In an embodiment, computer system 100 is programmed using a plurality of different data science models that can be selected for use as, or as part of, the transformations or functions 304 of FIG. 3A. Each model is programmed to input a set of variables and to output a response; therefore, each model, whether "supervised" or "unsupervised", is implemented as a mapping function. In an embodiment, computer system 100 is programmed to offer models from existing Python machine learning libraries, such as the "scikit-learn" library, and user-defined models.

In an embodiment, computer system 100 is programmed to receive input to deploy a modeling web service which will allow for modular construction of standard functionalities. For example, embodiments may be programmed to receive externally programmed functions for feature preprocessing and selection, performance logging, prediction logging, model serialization, and feature importance reporting.

2.3 Validation Operations

In an embodiment, computer system 100 is programmed to implement model validation functions. In one embodiment, with model validation, an input dataset is divided into one or more training segments and test segments. The training segments are used to train a model, after which fitting is executed. The model then is tested by inputting the test segments to determine how accurately the model predicts expected output after having been trained. Any machine learning model can predict only as well as the training data is accurate; therefore, to avoid bias, preferred practice is to divide the data and not to train the model on the test data. Dividing data for training and testing purposes may use any of several approaches. In one embodiment, computer system 100 is programmed to implement random shuffling; for a binary classifier, computer system 100 is programmed to randomly select training data and testing data from a single dataset, so that the training data and test data have the same distribution of the binary options to be classified. In another embodiment, computer system 100 is programmed to implement K-fold cross-validation, which ensures complete coverage of the dataset in training and testing, and/or nested cross-validation.

In an embodiment, as indicated by step 4 of FIG. 3A, graphical or visual input may specify initiating a data exploration routine in which the chain transforms specified by table 310 are executed on the stored data, resulting in a graphical display 314 of output data and/or a table display 312 of output data. Different explorations may specify different graphs, curves, charts, tables or other visualizations or captures of output data.

In an embodiment, as indicated by step 5 of FIG. 3A and block 316, graphical or visual input may specify executing a Save operation in which an association of the columns selected at 302, the transforms selected at 304 and organized in the order of table 310 are stored in association as an exploration session 318. Names may be associated with exploration sessions 318 to uniquely identify them for a particular user account. The exploration output 312, 314 may be concurrently pushed to the database 114.

After or concurrently as part of these steps, computer system 100 may be programmed to implement validation using several validation processes or algorithms. In one embodiment, data exploration logic 106 is programmed with validation logic that randomly samples a specified dataset, executes model training using the random sample, provides validation output and supports selecting another random sample to repeat validation. This approach ensures that the full dataset is used both for training data and testing. In another embodiment, an exploration may be iteratively repeated for a plurality of times using rolling window validation, in which a specified subset of data, sometimes representing a set interval of time for time series data, is used for training and predicting subsequent periods. In some embodiments, data exploration logic 106 is programmed to support nested cross-validation to improve resistance to bias.

Figure 5:
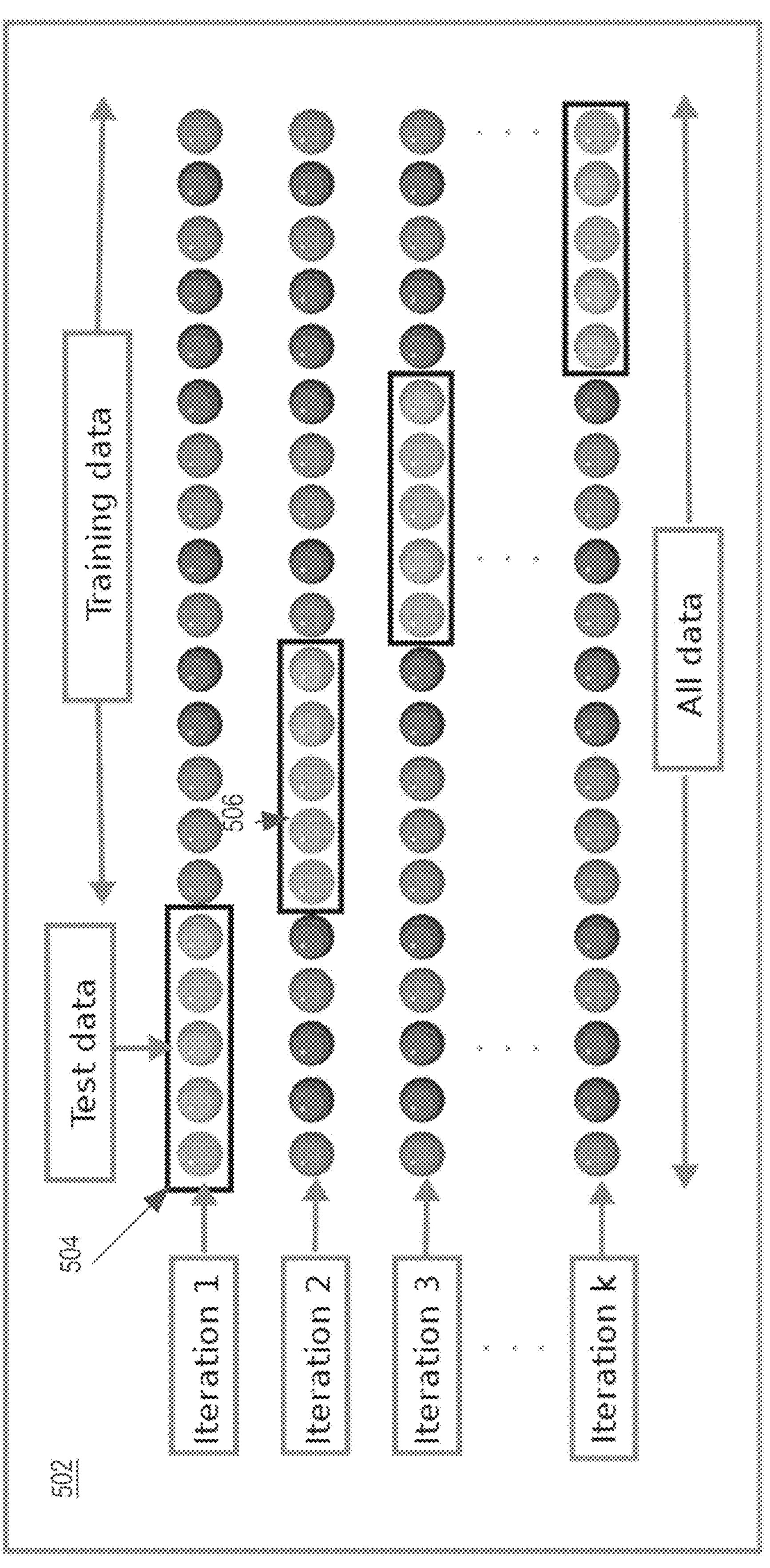
FIG. 5 schematically illustrates the selection and use of data in rolling window validation.

FIG. 5 schematically illustrates the selection and use of data in rolling window validation. In rolling window validation, a specified subset of data is used for training in a first period, and other subsets of the same size are used for training in second and other periods. For example, validation view 502 of FIG. 5 illustrates a plurality of iterations of training denoted iteration 1 to iteration k. In iteration 1, test data 504 comprises five (5) data points or subsets selected from the start of the available training data. In iteration 2, test data 506 comprises a subsequent five (5) data points or subsets from a range that is consecutive to and disjoint with respect to test data 504. For subsequent iterations, successive subsets of test data march forward in the same manner, so that eventually for iteration k all the training data has been the subject of testing.

Figure 6:
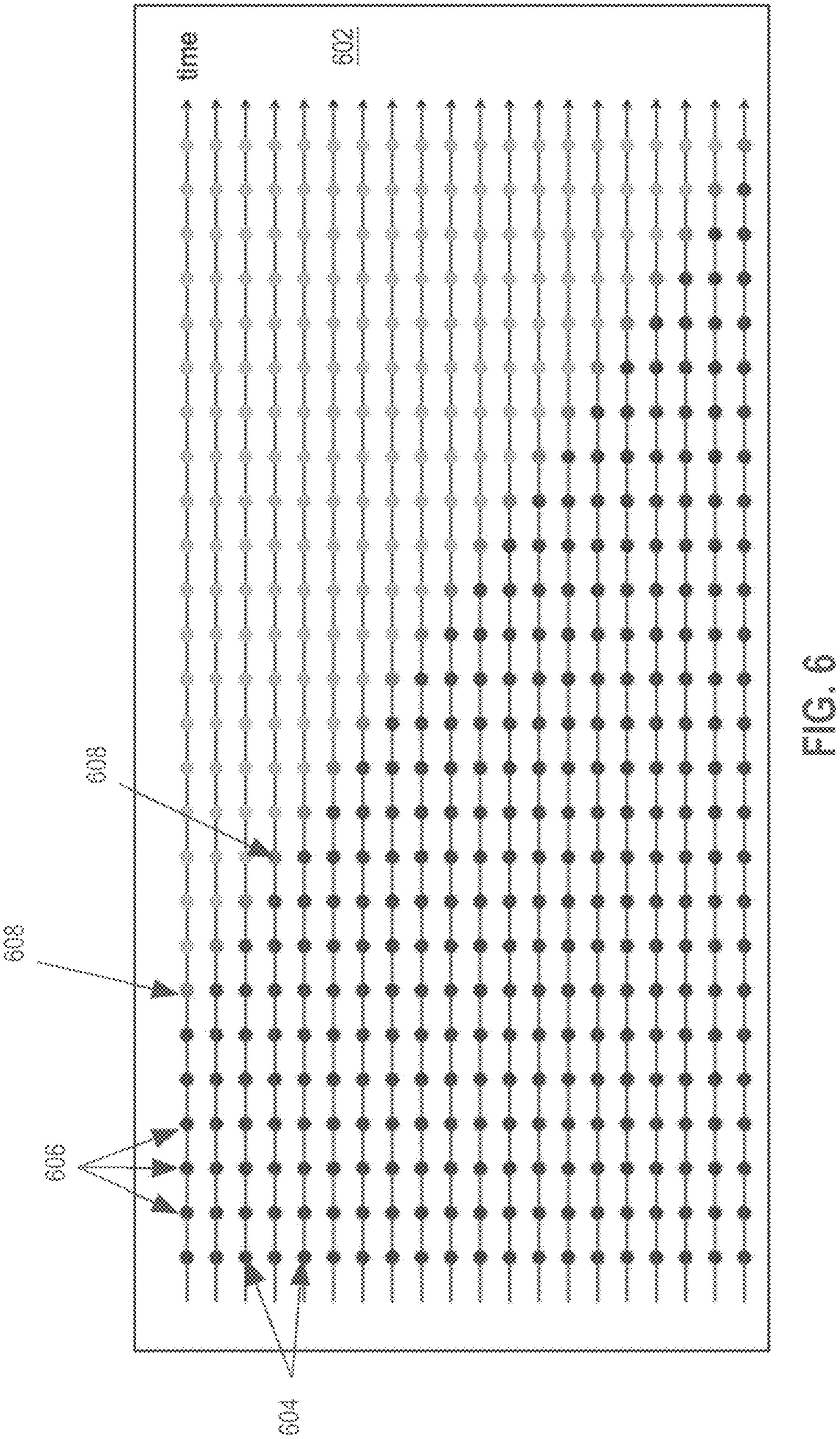
FIG. 6 schematically illustrates the selection and use of data in walk forward validation.

Additionally or alternatively, computer system 100 may be programmed to implement validation using walk forward validation, in which the size of the training data is dynamic, and is allowed to accumulate based on a starting point. FIG. 6 schematically illustrates the selection and use of data in walk forward validation. In walk forward validation, the size of training data is dynamic and the training data accumulates from a starting point or boundary that does not change. For example, in FIG. 6, a validation view 602 comprises a plurality of lines 604 each representing a different iteration of a trial consisting of training and test for a model; time increases from left to right. For each iteration, a plurality of training data subsets 606 are used for training, and a test data subset 608 is used for testing. For each iteration, the test data subset 608 is disjoint in relation to the training data and can be the next data subset after the training subsets 606. In this manner, the testing data walks forward away from the training data, and the beginning of the training period is fixed at the start. In contrast, in rolling window validation of FIG. 5, the beginning of the training period moves forward. Points or dots in FIG. 6 may represent any unit or subset of data, including a year of data, a month, or any other period or group.

In an embodiment, computer system 100 is programmed to receive input to graphically display any of a plurality of visual graphs or curves that visually illustrate data results or performance in a computer display, and to generate and cause displaying the curves. These graphs or curves serve as effective visual inspection tools to evaluate model performance after executing validation, or as part of a continuous iterative process of model definition, exploration and validation. In various embodiments, computer system 100 is programmed to generate and cause display one or more of:

1. Learning curve, to validate performance over different data training or testing ratio sizes. In an embodiment, learning curve logic is programmed to execute time series evaluation using trained test ratios of different sizes and to output a visual graph that correlates model performance to training size from smallest training size to largest. In general, a model that produces a higher training score than testing score is said to be over-fitted. In under-fitting, model performance is worse in test than in training, and often such models do not improve with added training data. Data scientists typically seek a model that produces acceptable prediction even when training with less data than is desirable. Therefore, in embodiments, learning curve functionality is useful to visually graph points at which models transition from under-fitting to over-fitting.

Figure 7:
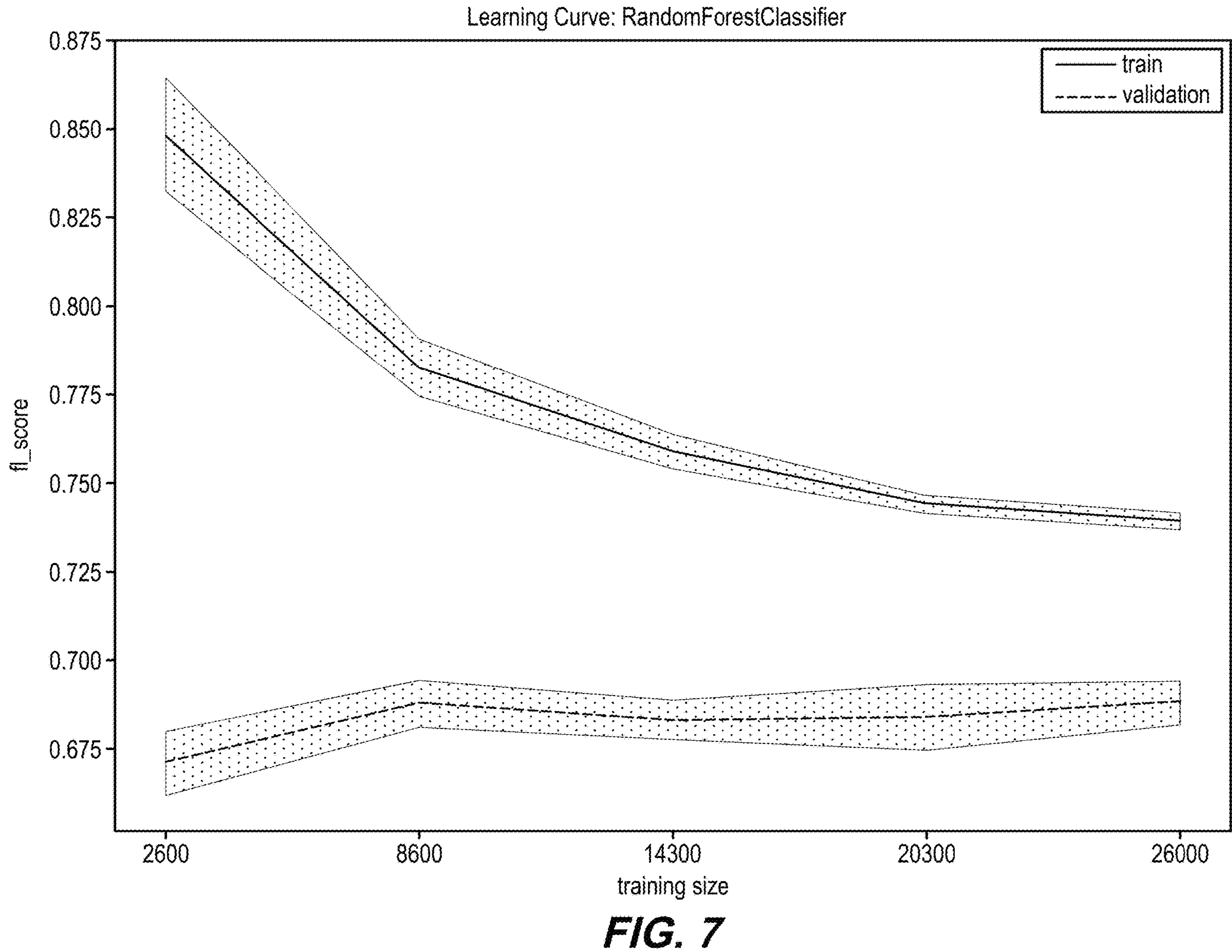
FIG. 7 illustrates a learning curve, based on execution of a random forest classifier, which may be visually and graphically displayed using a computer display device, in one embodiment.

FIG. 7 illustrates a learning curve, based on execution of a random forest classifier, which may be visually and graphically displayed using a computer display device, in one embodiment. In an embodiment, learning curve logic is programmed to generate a visual graph in which training data size is on the X axis and performance appears on the Y axis.

2. Validation curve, to validate performance over changing values of a model's hyper-parameter(s). In an embodiment, validation curve logic is programmed to plot a training score and testing score over differences in a particular hyperparameter of the machine learning model. In one embodiment, the validation curve logic is programmed to plot from the least to most complex solution. As the model moves from less to more complex, an inverted or concave "U" form of graph appears for test performance given a score for which a higher value increases better performance. As a model is forced to stay simple, it will be generalizable but not tightly fit to the data yielding relatively low performance. As the model is allowed to be complex, it will be so tightly coupled to training data that it does not generalize well and will produce low performance. A level of complexity between these extremes will produce ideal performance and the visualization provided by a validation curve may enable a user to determine when attributes of the model have been selected correctly.

Figure 8:
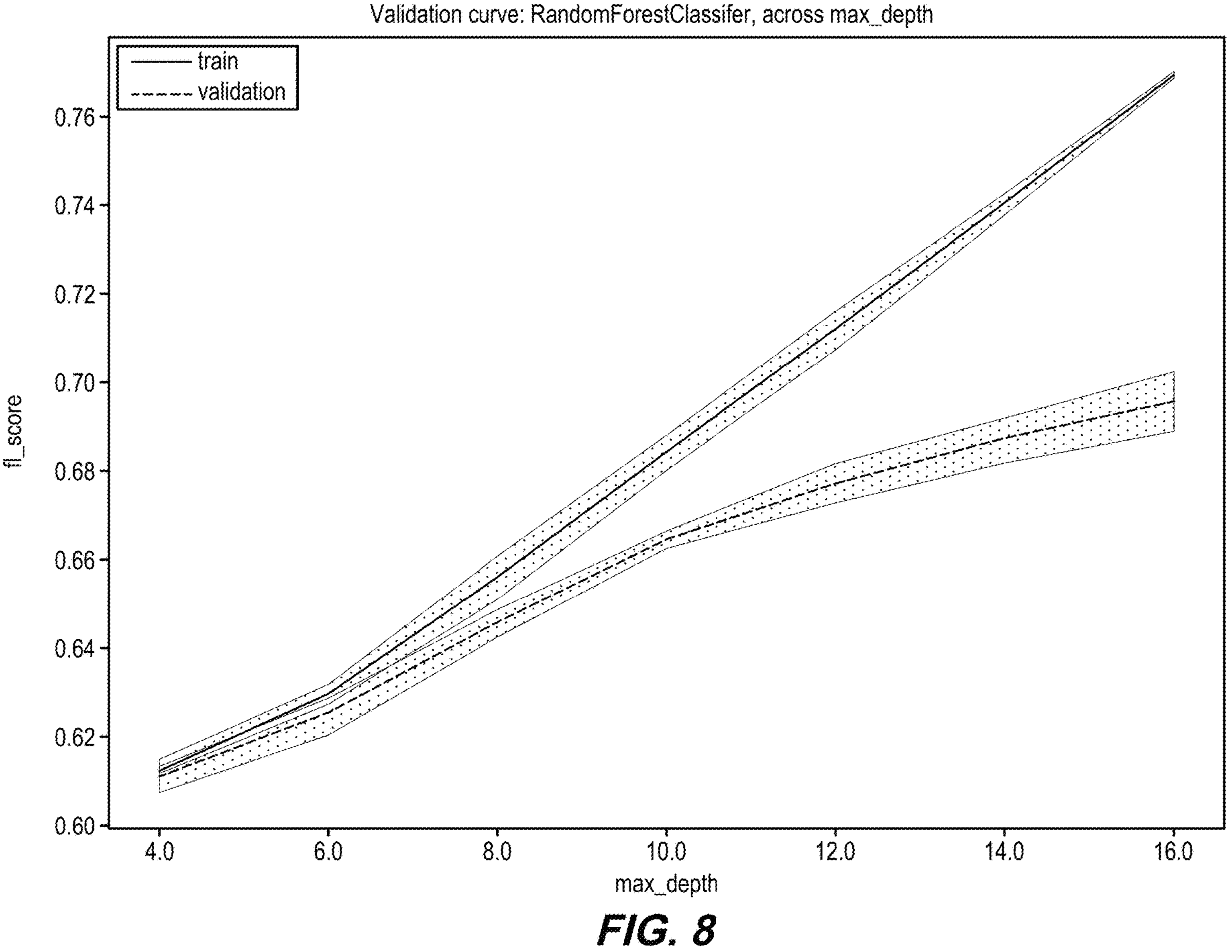
FIG. 8 illustrates a validation curve, based on execution of a random forest classifier, which may be visually and graphically displayed using a computer display device, in one embodiment.

FIG. 8 illustrates a validation curve, based on execution of a random forest classifier, which may be visually and graphically displayed using a computer display device, in one embodiment. In this case, validation curve logic has been programmed to generate a display showing that the max depth hyperparameter of a random forest classifier is increased so that the model is allowed become more complex and more tightly coupled to the data, and compared to a measure of performance.

3. Calibration curve, to validate performance over different probability bin thresholds. In an embodiment, calibration curve logic is programmed to facilitate comparing the predictive probability of a model to the actual proportionate frequency of the positive class in a binary classification problem within a certain predictive probability bin. In an embodiment, calibration curve logic is programmed to display a visual graph having an X-axis representing bin predictive probability, typically divided at 5% or 10% intervals, and a Y-axis representing the relative frequency of pos class instances in that bin. A model yielding output in this relationship having a slope close to "1" may be deemed well-calibrated.

Figure 9:
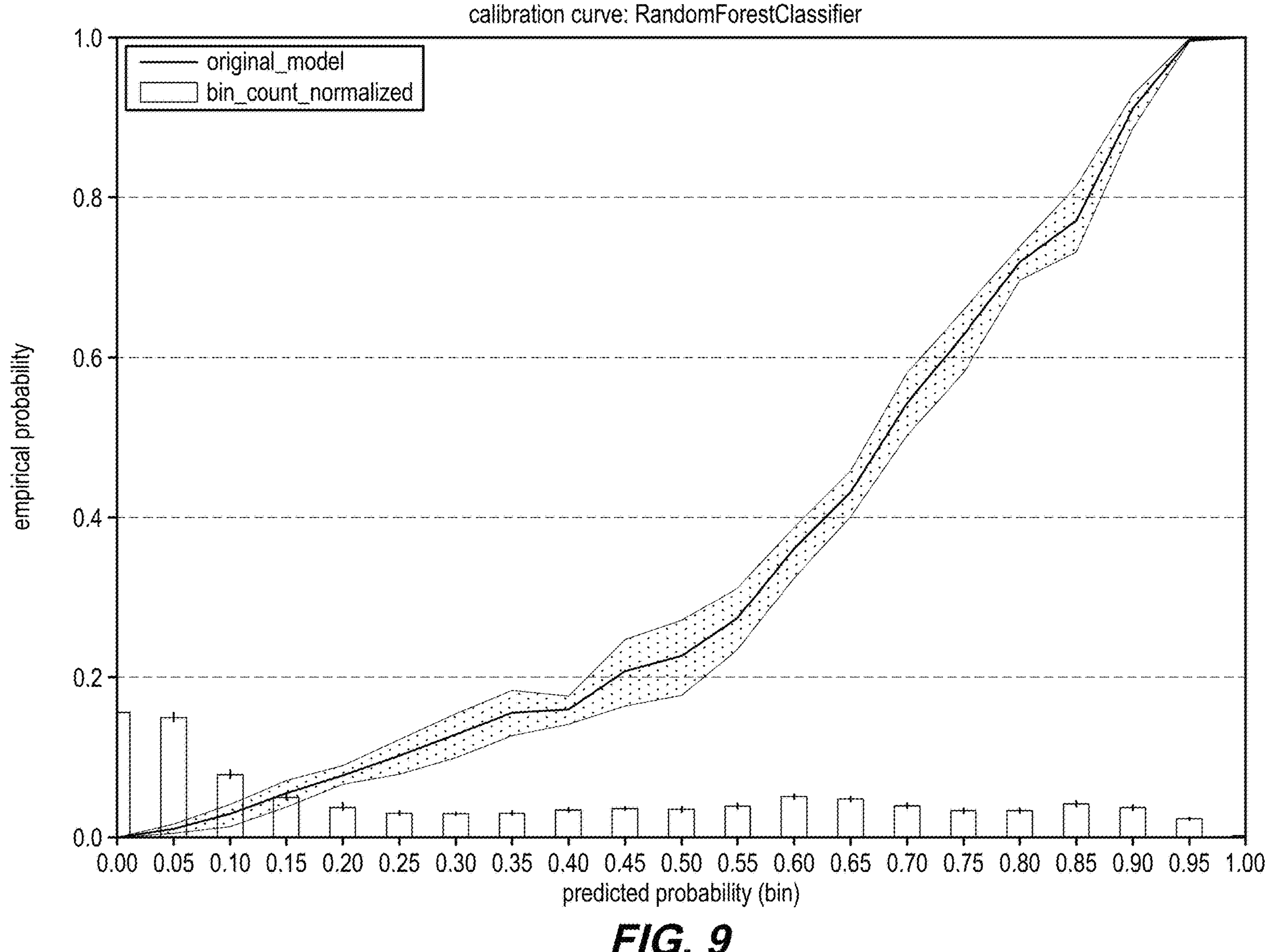
FIG. 9 illustrates a calibration curve, based on execution of a random forest classifier, which may be visually and graphically displayed using a computer display device, in one embodiment.

FIG. 9 illustrates a calibration curve, based on execution of a random forest classifier, which may be visually and graphically displayed using a computer display device, in one embodiment. In an embodiment, calibration curve logic is programmed to associate predictive values with bins; a link is established via a data index of the predictive probability bins with class labels as "0" or "1" (FALSE or TRUE). Thus, in a well-calibrated model, the 30% bin should comprise 30% of actually TRUE data points; this would indicate that the predictive probability is a reliable measure of empirical probability.

4. Precision and recall curves. In an embodiment, precision and recall curve logic is programmed to generate and output a graph in which, for a specified machine learning model, precision on the X axis is plotted against recall on the Y axis. Precision and recall are performance evaluation metrics for label-oriented classification models. In an embodiment, precision and recall are plotted for different decision thresholds. For example, in a binary classification problem in which classification output must be "0" or "1", or TRUE or FALSE, data scientists may set configuration parameters such that a probability greater than 50% resolves to a TRUE or "1" classification; in other cases, more nuanced logic may be needed to dictate classification output, and the precision and recall curve facilitates selecting appropriate configuration parameters.

2.4 Deployment Functions and Pipeline Management

Figure 3B:
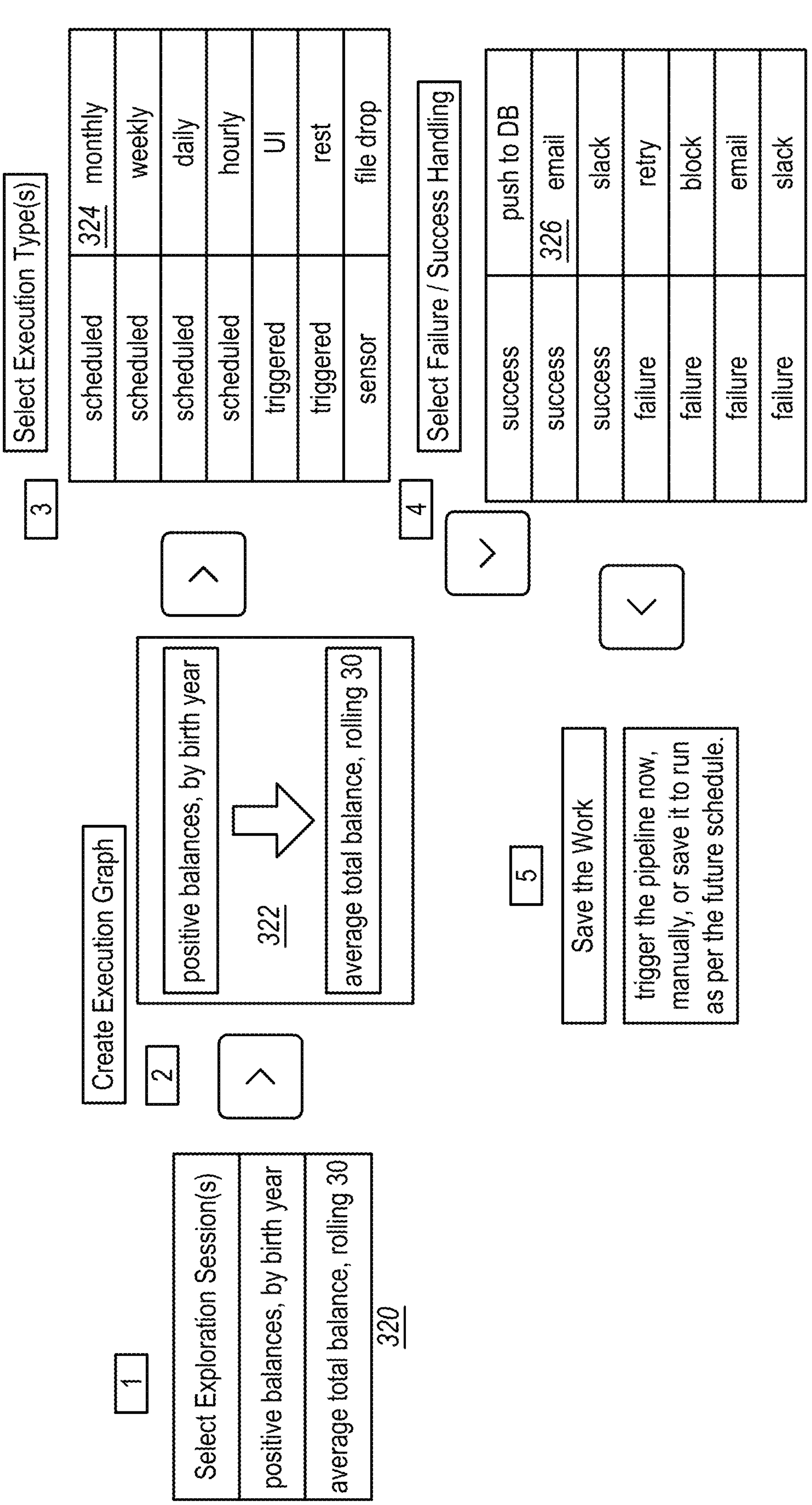
FIG. 3B illustrates data structures, data flows, and functional operations of one embodiment of the pipeline management logic of FIG. 1.

FIG. 3B illustrates data structures, data flows, and functional operations of one embodiment of the pipeline management logic of FIG. 1. In general, pipeline management is programmed to facilitate arranging a plurality of different exploration sessions into scheduled or ad hoc execution on specified data sets. Pipeline management is convenient to address exploration sessions that require a specified order of execution for viability, different periodicity, or that need different success or failure handling operations. Furthermore, programmed pipeline management precludes the need for mentally retaining the names of explorations, order, and times of execution and permits programming execution initiation and order in a manner far more complex than possible with the human mind.

In an embodiment, at step 1 of FIG. 3B, input is received to select one or more exploration session(s). In an embodiment, computer system 100 is programmed to create, store and display a list 320 of exploration sessions that have been named and previously stored; the list may be displayed in a GUI widget and the input may comprise drag-and-drop signals or other visual, graphical input to select a particular named exploration session.

At step 2 of FIG. 3B, in an embodiment, computer system 100 is programmed to create an execution graph 322 to programmatically express an order of execution of the exploration sessions, and relationships of output columns or values from a first exploration session to input columns or values of a second or subsequent execution session. In an embodiment, execution graph 322 is a directed acyclic graph that is stored in main memory of computer system 100. Execution graph 322 may have any level of complexity and need not represent a single linear order. In some embodiments, execution graph may implement decision nodes; lists, tables or files specifying the dependencies of a later executed exploration upon a prior executed exploration, or other decision logic.

At step 3 of FIG. 3B, in an embodiment, computer system 100 is programmed to receive input to select one or more execution types for the execution graph 322. In an embodiment, as shown in table 324, execution types may comprise scheduled, for any of a plurality of different periods such as monthly, weekly, daily, hourly; triggered, based on input in the user interface or a REST API call; or sensor-based execution, for example, based upon detecting the storage of a specified file or file type in a designated folder of a repository.

At step 4 of FIG. 3B, in an embodiment, computer system 100 is programmed to receive input specifying a selection of a success handler and/or a failure handler. As shown by table 326, in various embodiments, a success handler may comprise pushing data to a database; generating and sending an email providing a notification of success; generating and sending a chatroom message providing a notification of success. As shown by table 326, in various embodiments, a failure handler may comprise retrying an execution; blocking execution of the execution graph; generating and sending an email providing a notification of failure; generating and sending a chatroom message providing a notification of failure.

Figure 4A:
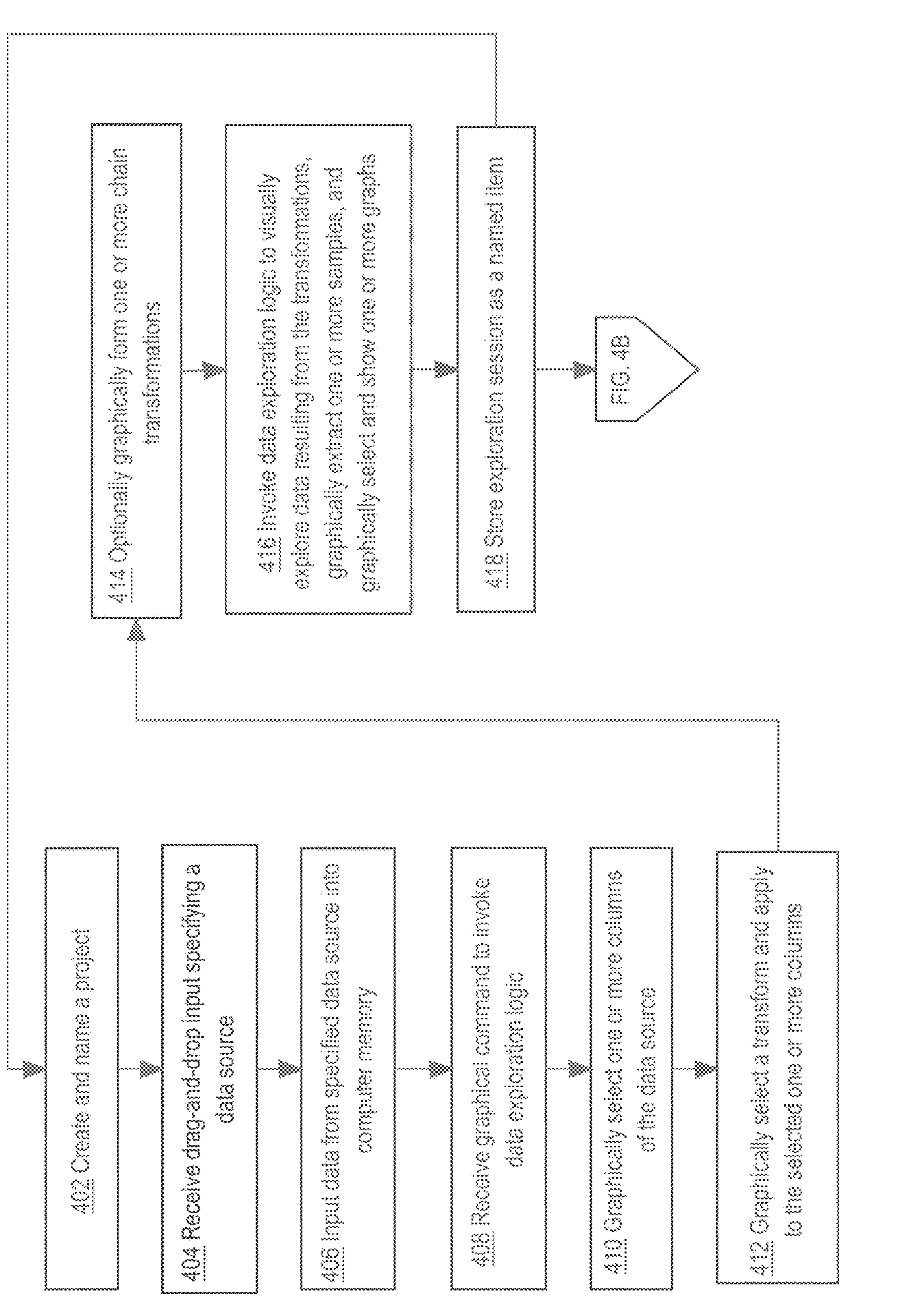
FIG. 4A illustrates an algorithm for implementing the systems and processes of FIG. 1, FIG. 2, FIG. 3A.
Figure 4B:
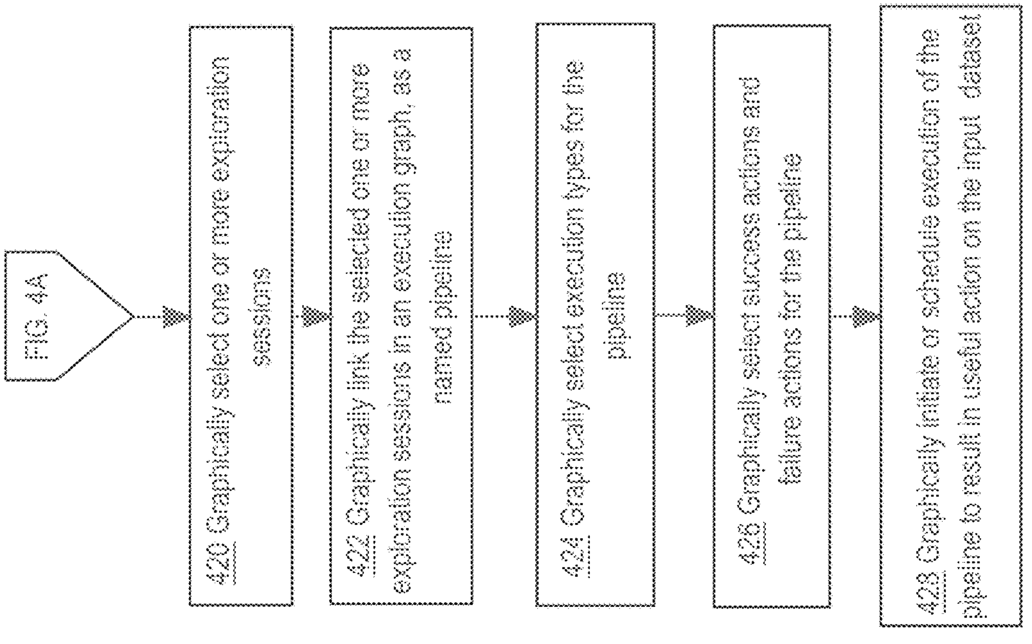
FIG. 4B illustrates other steps of the algorithm of FIG. 4A.

FIG. 4A illustrates an algorithm for implementing the systems and processes of FIG. 1, FIG. 2, FIG. 3A. FIG. 4B illustrates other steps of the algorithm of FIG. 4A. Referring first to FIG. 4A, in an embodiment, computer system 100 is programmed at step 402 to receive input to create and name a data science project. Step 402 may be programmed to cause inserting a row into a project table of database 114 that specifies the name of the project, a user account associated with the project, date of creation, and references or pointers to a data source table, data exploration table, output locations or other metadata associated with a project.

In an embodiment, computer system 100 is programmed at step 404 to receive visual or graphical input specifying a data source. For example, one of the data sources 202 may be specified. In response, in an embodiment, computer system 100 is programmed at step 406 to input data from the specified data source into main memory.

In an embodiment, computer system 100 is programmed at step 408 to receive a graphical command to invoke the data exploration logic of FIG. 1, FIG. 3A. In an embodiment, computer system 100 is programmed at step 410 to receive input to graphically select one or more columns of the data source. For example, the process of step 1 of FIG. 3A may be used.

In an embodiment, computer system 100 is programmed at step 412 to receive input to graphically select a transform and apply the transform to the selected one or more columns. For example, the process of step 2 and step 3 of FIG. 3A may be used. Optionally, at step 414, computer system 100 is programmed to receive visual or graphical input to form one or more chain transformations as part of a data exploration process of a project.

In an embodiment, computer system 100 is programmed at step 416 to invoke the data exploration logic to visually explore data resulting from the transformations, graphically extract one or more samples, and graphically select and show one or more graphs. In an embodiment, computer system 100 is programmed at step 418 to store an exploration session as a named item, for example in a data exploration table of database 114. Control then transfers to FIG. 4B.

Referring now to FIG. 4B, in an embodiment, computer system 100 is programmed at step 420 to graphically select one or more exploration sessions. For example, step 420 may be programmed to execute the process described above for step 1 of FIG. 3B.

In an embodiment, computer system 100 is programmed at step 422 to graphically link the selected one or more exploration sessions in an execution graph, as a named pipeline. For example, step 422 may be programmed to execute the process described above for step 2 of FIG. 3B.

In an embodiment, computer system 100 is programmed at step 424 to receive input to graphically select execution types for the pipeline. For example, step 424 may be programmed to execute the process described above for step 3 of FIG. 3B.

In an embodiment, computer system 100 is programmed at step 426 to receive input to graphically select success actions and failure actions for the pipeline. For example, step 426 may be programmed to execute the process described above for step 4 of FIG. 3B.

In an embodiment, computer system 100 is programmed at step 428 to graphically initiate or schedule execution of the pipeline to result in useful action on the input dataset. For example, step 428 may be programmed to execute the process described above for step 5 of FIG. 3B.

2.5 Business Logic Operationalization

Figure 1C:
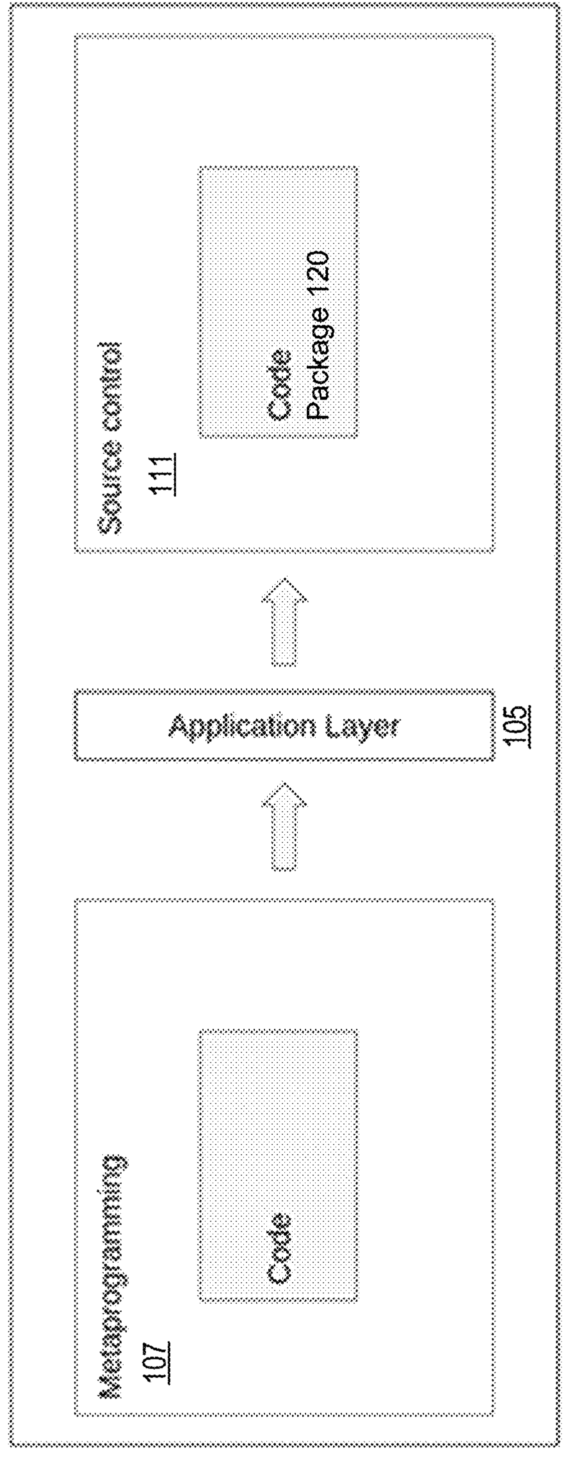
FIG. 1C illustrates a process for ingesting business logic to create data elements for management under programmatic control to implement one embodiment.

FIG. 1C illustrates a process for ingesting business logic to create data elements for management under programmatic control to implement one embodiment. Computer system 100 may be programmed to operationalize user-defined computer code that pertains to a user's or organization's business logic through platform metaprogramming 107. For example, user business logic programmed to data transformations operations may be ingested and used to create an edge of FIG. 1B.

In an embodiment, the platform comprises an application layer 105 that specifies shared communications protocols and interface methods between the platform and network services. In an embodiment, packaging logic 103 of computer system 100 is programmed to execute platform packaging functions by exfiltrating business logic comprising code through the application layer 105 and into source control 111. In an embodiment, a resulting code package 120 in source control 111 is purely user business logic, including any and all of its programming dependencies.

In an embodiment, the platform metaprogramming 107 ingests user business logic by detecting specified user business logic, serializing it to text (along with any in-memory dependencies detected by a linting program), and making network call(s) to send the serialized into the application layer 105. The application layer 105 may store its own textual representation of the underlying business logic, potentially enhancing the speed and convenience with which the underlying business logic may be used in the future. The application layer may also store metadata associated with the underlying business logic or its ingestion into the platform. In source control 111, user business logic may be stored in a repository that represents a functioning programming library, including install requirements and versioning, entirely within the platform.

In an embodiment, ingesting user business logic by the platform metaprogramming 107 comprises encapsulating the user business logic to make it into an instance of a functional representation type that is provided by the platform's domain-specific language (an "edge instance"). An edge instance may make use of user-supplied metadata, metadata inferred from user business logic, or contextually-determined metadata. Edge instance metadata may allow an edge instance to extend the capabilities of the user business logic. Edge instance metadata may include type metadata. In an embodiment, type metadata comprises one of several functional "styles" offered by the platform metaprogramming 107 that allow for users to reuse user business logic in a variety of functional contexts, particularly as it pertains to a number (none, one, or many) of inputs and outputs; origination information about the edge instance (such as which user created it or when it was created); where the user business logic is stored in source control; the access hierarchy (in terms of user authorization) associated with the edge instance (an "authorization model"). FIG. 1D illustrates type metadata associated with data elements for management under programmatic control in one embodiment. In the embodiment illustrated in FIG. 1D, an edge type is defined by a style purely based on a number of inputs and outputs for that edge; but, in other embodiments, an edge type may depend on other factors, as previously explained.

In an embodiment, instantiating user business logic into an edge instance may allow for failure handling (for example, a parameterization for programming logic that is run in the event that an exception occurs) or user control over how the running of said logic will occur (for example, whether or not said logic should lead to a suppression of the triggering exception); domain-specific type checking; automated naming or serialization of all output to a given external datastore (for example, a data lake or database); performance recommendations; or an ability to see outside of the traditional, functional, encapsulation of scope of the user business logic were it running on its own, (that is, not as an edge).

In an embodiment, a user must be authenticated and authorized ("permissioned") for that user to execute platform functions related to ingesting business logic and using ingested business logic. Users with requisite permissions may be allowed to log in and execute specific actions on specific objects in the platform. In an embodiment, functionalities requiring permissions may be securely logged or audited by the application layer 105, since the application layer 105 may be outside the scope of the user and their environment. In an embodiment, when writing to source control 111, if a layer of desired authorization hierarchy does not yet exist (for example, for a new project), then the platform may auto-create said authorization layer, including structuring the project as a portable, installable software library. In an embodiment, the new authorization layer may only be auto-created for the user if the user is authorized to engage the platform in creating net-new authorization layers.

In an embodiment, once an edge instance has been created, it may be loaded into any arbitrary instance of the platform's computing process by any user with requisite permissions. Loading an edge instance into the platform may be accomplished by the platform metaprogramming 107, which may, for a given edge instance for which the requesting user is permissioned: load the edge's textual representation and associated metadata through the application later 105; auto-install any required dependencies; compile the loaded textual representation; use any retrieved metadata to complete the instantiation of the edge instance, at which point the edge is available for in-memory use.

2.6 Automatic Generation and Packaging of Program Code

Referring again to FIG. 1C, in one embodiment, packaging logic 103 may be programmed to automatically generate computer program source code in a human-readable language, capable of interpretation or compilation, as part of automated library composition. PYTHON, offered by the Python Software Foundation, having found wide use in data science is an example of a source language that can be automatically generated. Other embodiments may be programmed to generate code in other human-readable languages.

In an embodiment, packaging logic 103 is programmed to receive input from a user selecting one of a user-defined Edge comprising a user-defined data transformation operation or a user-defined Edge Queue comprising a plurality of user-defined data transformation operations from which to automatically extract Python code. User-defined Python functions may be extracted from the development environment, passed through the security-and-application layer, routed to the proper Git organization and repository, and then packaged into portable, installable Python libraries, libraries which provide code that is no longer dependent on the platform.

Each user-defined function may be written into its own module, such as a .py file, with its necessary imports such as other Python modules, classes, functions, or other objects. In an embodiment, platform-generated modules may be automatically organized into Python sub-modules. Sub-modules may be subdirectories of a package 120. Each sub-module may comprise an auto-generated initialization file (denoted, for example, _init_.py) that enables importing of its encapsulated modules. This collection of sub-modules may provide Python functionality that can be imported into a Python process. Each package may provide its own, auto-generated installation file that allows for the package to be installed into an arbitrary Python environment. To support this capability, imports may be extracted from all modules within the library. These imports may then be mapped to packages (distributions) using a proprietary database an embodiment platform automatically updates as part of its package installation capabilities. These package dependencies may then be automatically written into a requirements file (with or without a version specified, depending on the user's preference) that the installation file can use to automatically reconcile dependencies.

Each resulting package 120 may comprise an auto-generated installation file that allows for the package to be installed into an arbitrary PYTHON environment. In an embodiment, to support this capability, packaging logic 103 is programmed to extract imports from all modules within the library. The packaging logic 103 is programmed to map the imports be mapped to packages 120, which can be used as distributions, using the database 114, which the platform automatically updates as part of its package installation capabilities. In an embodiment, packaging logic 103 is programmed to write these package dependencies into a requirements file in source control 111. The requirements file can include a version value, depending on the user's preference. Thereafter, an installation file can use the requirements file to automatically reconcile dependencies of the package 120.

In an embodiment, computer system 100 is programmed to execute a graph of an execution flow for data and functions that have been defined by tiles, edges, and the identity and relationships of tiles and edges that may be stored in and represented by a graph, as previously discussed for FIG. 1B. For example, pipeline management logic 108 is programmed to facilitate arranging a plurality of different exploration sessions into scheduled or ad hoc execution on specified data sets.

Figures 11A, 11B:
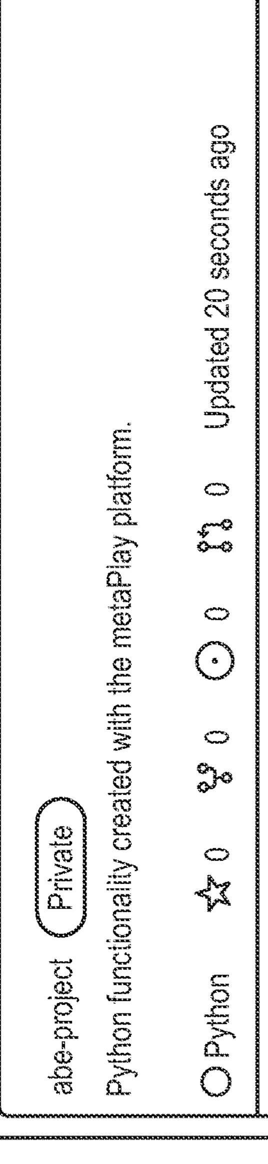
FIG. 11A illustrates an example of a response message after auto-creating a repository.
FIG. 11B shows project that has been structured as a functioning and installable Python library.

In an embodiment, computer system 100 is programmed to receive graphical input from a user selecting one of a user-defined Edge (FIG. 1B) comprising a user-defined data transformation operation or a user-defined Edge Queue comprising a plurality of user-defined data transformation operations from which to automatically extract Python code. In response, packaging logic 103 is programmed to extract user-defined Python functions from the development environment, pass the functions through the application layer 105, routed to a Git organization and repository. FIG. 11A, FIG. 11B, FIG. 11C, FIG. 11D, FIG. 11E, FIG. 11F, FIG. 11G illustrate examples of output to a remote GIT repository of automatically packaged code in a human-readable language in accordance with one or more embodiments. In one embodiment, if routing the functions to a Git organization and repository yields a response from the Git system that the requested repository does not exist, then packaging logic 103 is programmed to automatically create a new repository, causing the Git system to generate a response message. FIG. 11A illustrates an example of a response message after auto-creating a repository. In the example of FIG. 11A, the name of the repository is "abe-project." Source control 111, in an embodiment, may be implemented using Git. Git compatibility may provide important source-control capabilities that include distributed versioning.

In an embodiment, packaging logic 103 is programmed to automatically package and store a user-defined function in the form of Python code in a portable and installable Python library in four steps:

1) import the "pandas" library,
2) import a proprietary "edge" module,
3) wrap a user-defined function using the "edge.apply" decorator (e.g., higher-level function), and
4) allow the user to specify a serialization path or location.

In an embodiment, packaging logic 103 is programmed as follows. Based on edge definitions, a user defined Edge is selected to receive a user-defined function as input and conduct compatibility or validity checking to ensure the user-defined function and its imports and dependencies has correct basic syntax to be executable in an expected working environment. In particular, the user defined Edge comprises a user-defined data transformation operation or a user-defined Edge Queue comprising a plurality of user-defined data transformation operations. For example, the user defined Edge comprises one or more decorators which includes a Python library whose API provides one or more higher-order functions. In this manner, user-defined functions are automatically captured and supplemented with decorator or annotation code that implements system functionality that may be executed before or after the user function, or control arguments to the user function.

When the decorators receive the user-defined function in, the decorators perform an auto-packaging process to consume the user-defined function and proceed to capture the code underlying the user-defined function along with any dependencies as a string/textual data. The decorators select an installable package from the portable and installable library base on the captured textual data of the user-defined function along with any dependencies. For example, the installable package can be an existing Python package. As another example, the installable package can be created by instantiating a new Python package and importing different dependencies included in the user-defined function in the form of Python code. As a result, the decorators write the textual data of user-defined function into the structure of an installable package in a remote code repository, such as a portable and installable Python library. This auto-packaged code of user-defined function is then installable, importable, and independent of the platform. FIG. 11B shows project that has been structured as a functioning and installable Python library.

TABLE 1 presents a description of auto-packaging a user-defined function in functional terms and with code examples.

TABLE 1

Auto-packaging of code example

| | Step Description | Example |
|---|---|---|
| 1 | import the "pandas" library | import pandas as pd |
| 2 | import a proprietary "edge" module | from metaplay import edge |

TABLE 1-continued

| | Auto-packaging of code example | |
|---|---|---|
| | Step Description | Example |
| 3 | leverage the "edge, apply" decorator (i.e. higher-level function) to wrap a user-defined function | @edge.apply(organization = "metaPlay-Test", project = "abe-project") |
| 4 | the decorator allows for the serialization path or location to be specified by the user (but defaults can be set for these values in a programming session) | def srs_to_datetime(srs): """ 'srs' should be a 'pd. Series' instance, which will be converted to a datetime-like object via 'pd.to_datetime' """ return pd.to_datetime(srs) |

In addition, the decorators can use a user defined Edge to change the auto-packaged code of user-defined function in existing repositories and modules. An example of making edits into existing repositories and modules can be found in TABLE 2 below.

TABLE 2

| | An example of making edits into existing repositories and modules | |
|---|---|---|
| | Step Description | Example |
| 2 | import the widely used "pandas" library import our proprietary "edge" module | import pandas as pd from metaplay import edge |
| 3 | leverage the "edge, apply" decorator (i.e. higher-level function) to wrap a user-defined function | @edge.apply(organization = "metaPlay-Test", project = "abe-project") |
| 4 | the decorator allows for the serialization path or location to be specified by the user (but defaults can be set for these values in a programming session) | def srs_to_datetime(srs): """ 'srs' should be a 'pd.Series' instance, which will be converted to a datetime-like object via 'pd.to_datetime'. NOTE that I've updated the comment. """ return pd.to_datetime(srs) |

Figure 11C:
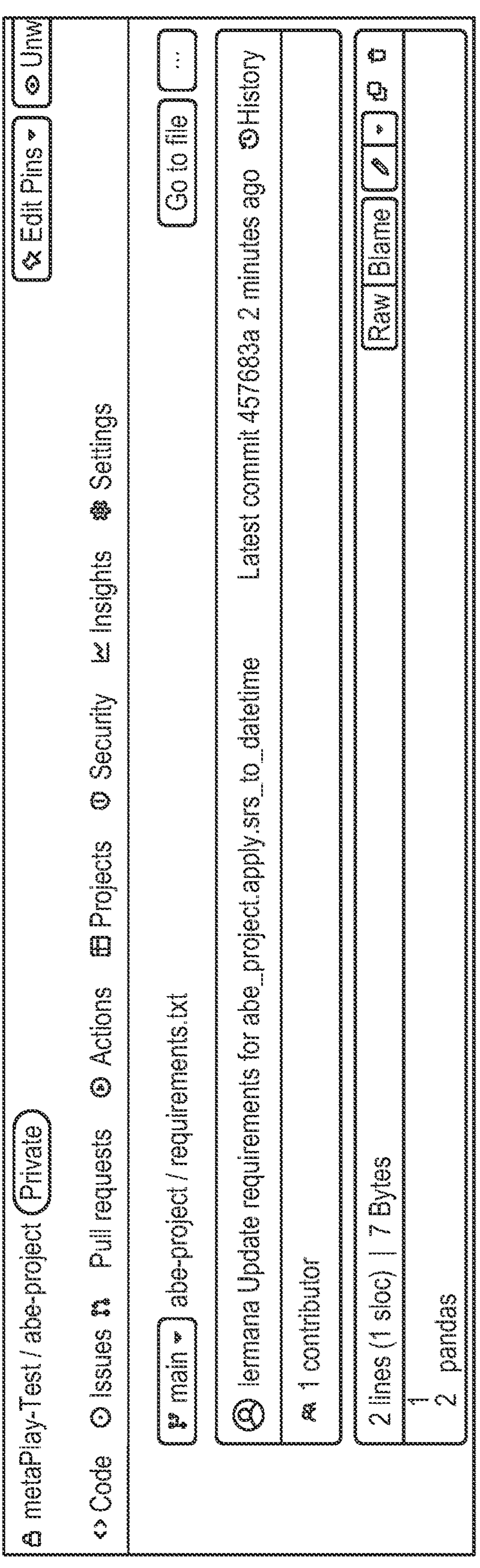
FIG. 11C shows an auto-generated requirements file, which includes the "pandas" library.

FIG. 11C shows an auto-generated requirements file, which includes the "pandas" library.

Figure 11D:
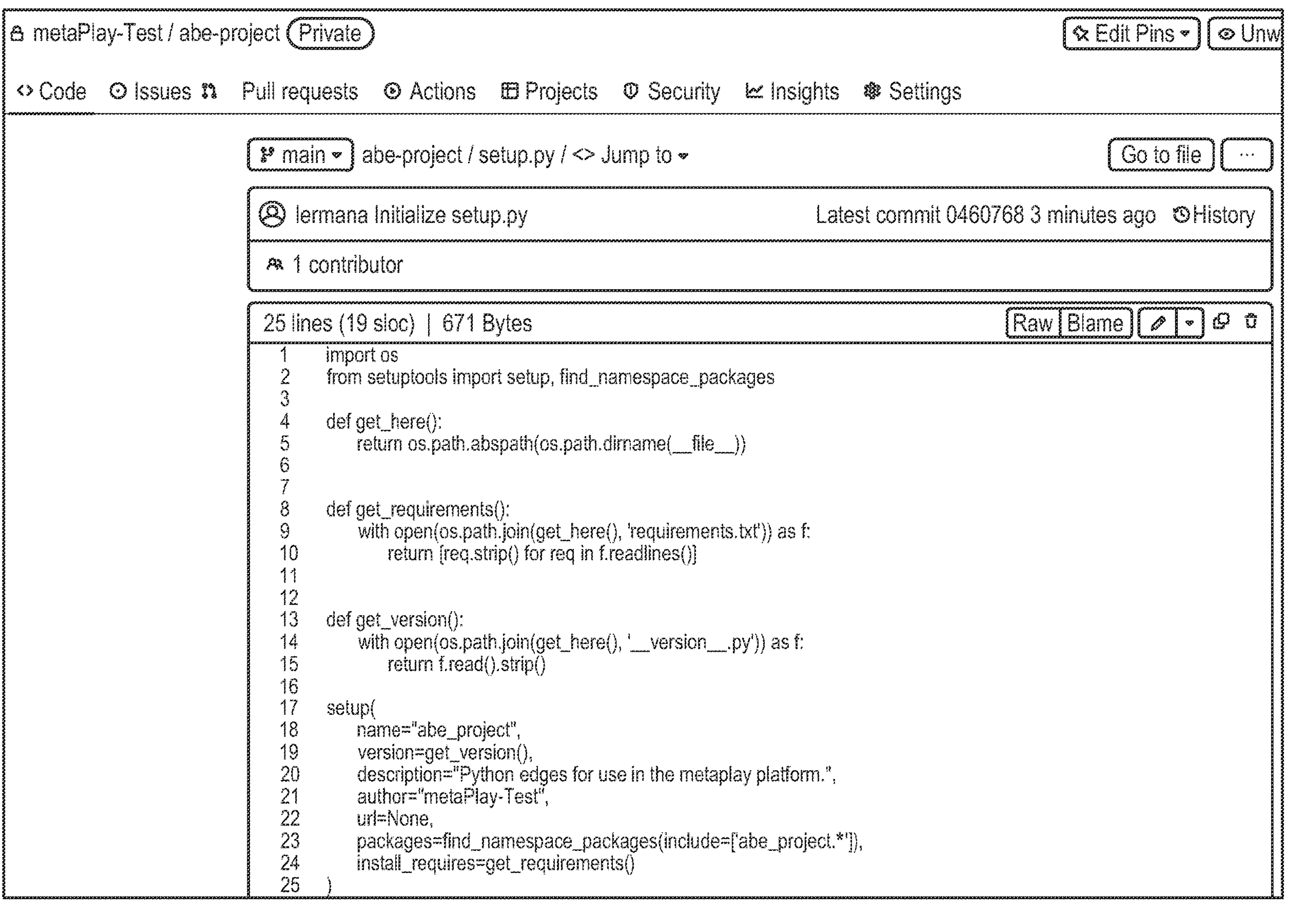
FIG. 11D shows an auto-generated setup.py file, which the Python package manager ("pip") runs to execute an install.

FIG. 11D shows an auto-generated setup.py file, which the Python package manager ("pip") runs to execute an install.

Figure 11E:
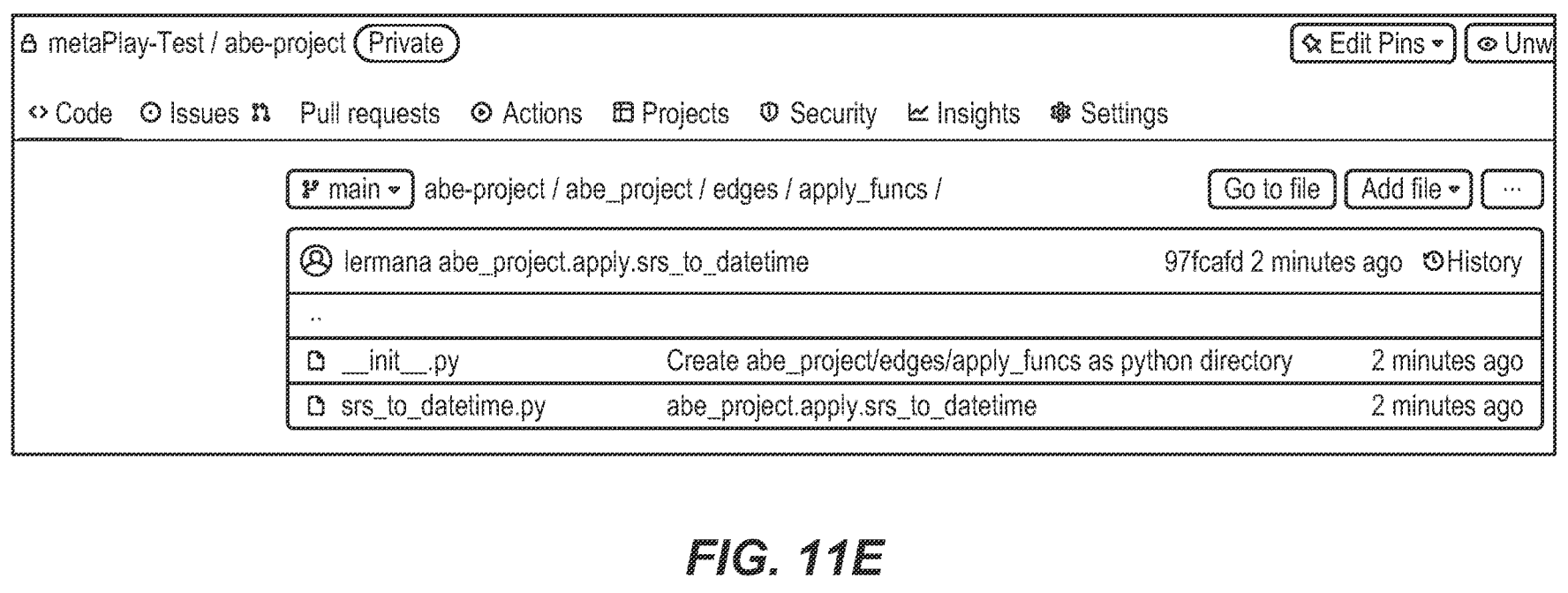

FIG. 11E shows an auto-generated Python-package-compatible directory structure.

FIG. 11F shows user-defined code that is serialized into a ".py" file or Python module, complete with required imports.

FIG. 11G shows the auto-packaging system can make edits into existing repositories and modules, and commit the edits into existing module of existing repository.

These techniques may implement code optimization so that custom code, when added, executes more efficiently. Furthermore, in embodiments, the use of Python is not required and other programming systems with different attributes may be used.

3. BENEFITS OF CERTAIN EMBODIMENTS

The disclosed embodiments provide a visual and graphical technology for creating, adjusting, and executing data science models, including classifiers, neural networks, and other machine learning models, without Python programming or other deep technical skills. Instead, embodiments are programmed to provide visual tools that users can interact using a graphical user interface to define, modify and execute machine learning models. Consequently, embodiments make data science and machine learning tools available to a new class of users.

Using these techniques, computer system 100 enables users to complete definition of a model, and a model pipeline, then deploy or make the pipeline available via a network using an automated program. In some embodiments, computer system 100 also is programmed with logic for re-training the model with new data; rebuilding the prediction mechanism or performance given a new requirement for a class creation rule; or changing class engineering. In some embodiments, pipeline management logic 108 is programmed to offer multiple models for the same underlying data. In some embodiments, implementing multiple models may comprise instantiating a plurality of server instances in a cloud computing center and executing a different model on each instance in connection with the same data sources. Deployment tools may include graphical or visual tools for selecting a model, connecting the model to a specified database, specifying how and when re-training will occur, and launching the model for execution using a particular virtual machine instance.

Embodiments offer the benefits of a modular, tool-oriented approach to graphical and visual construction of machine learning models, validation and deployment. Embodiments may integrate with TensorFlow, Keras, or other machine learning libraries, and may integrate with existing open-source Python libraries such as scikit learn to offer robust, tested machine learning models that facilitate integration of custom code.

In an embodiment, a system provides benefits that empower a data science workflow that is: efficient, fluid, systematic, and secure. Efficient: through automating and abstracting away numerous data operations workflows, the system allows data science professionals to spend less time on said operations workflows, to avoid errors pertaining to these operations workflows, and to focus almost entirely on data analysis. Fluid: the system offers a uniquely flexible interface into the design and implementation of data science workflows; said interface is modular enough to allow access to a variety of building blocks and foundational components, even in the midst of complex workflows, which allows data science professionals unique access into, and control over, their data science workflows. Systematic: through automating in a consistent and modular way data operations workflows such as I/O, the permissioned sharing of data and functionality, and environmental parity, the system enables data scientists to execute on clear, reproducible analyses; reproducibility is a key tenet of the scientific method. Secure: all data and functionality must pass through a security and application layer before it can be shared or otherwise ingested into the system; powerful authentication techniques, role-based access control, and a fine-grained audit trail protect data and functionality and provide deep record-keeping on activity within the system.

Embodiments comprise a CASL system that is: Comprehensive, encapsulating an entire data science workflow, from raw data transformation to machine learning model deployment; Automated, such that an entire process can be executed without human intervention, although processes may provide a modular interface into its components; excellent at Supervised Learning, wherein the objective may be to solve for an optimal classifier, given the totality of the system (features, transformations, machine learning) in which it may exist.

Embodiments incorporating platform packaging capabilities in their design and implementation may offer numerous benefits. A user may potentially retain control of user business logic even if a contractual relationship with the platform terminates, thus potentially protecting the user's ownership of her or his own work. The platform may be able to make use of the benefits of source control, including version histories and security controls, without needing to reimplement such functionality or put the onus on the user to master the usage of such technologies. Metaprogramming-driven exfiltration may allow for a clean delineation that makes it easy for a user to make use of existing user business logic within the platform, that is such logic does not have to be written particularly for, or within the confines of, the platform. The encapsulation of user business logic within a metaprogramming framework that relies on an application layer may allow for the implementation of security controls (authentication, authorization, and auditing) that enable secure and easy sharing of user business logic between users of the platform. Indeed, the insertion of a networked application layer between the textual representation and in-memory compilation of said text representation of a given piece of user business logic may allow for a unique level of insight into user authorization, user activity, dependency management, and inter-object relations in the platform.

4. IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
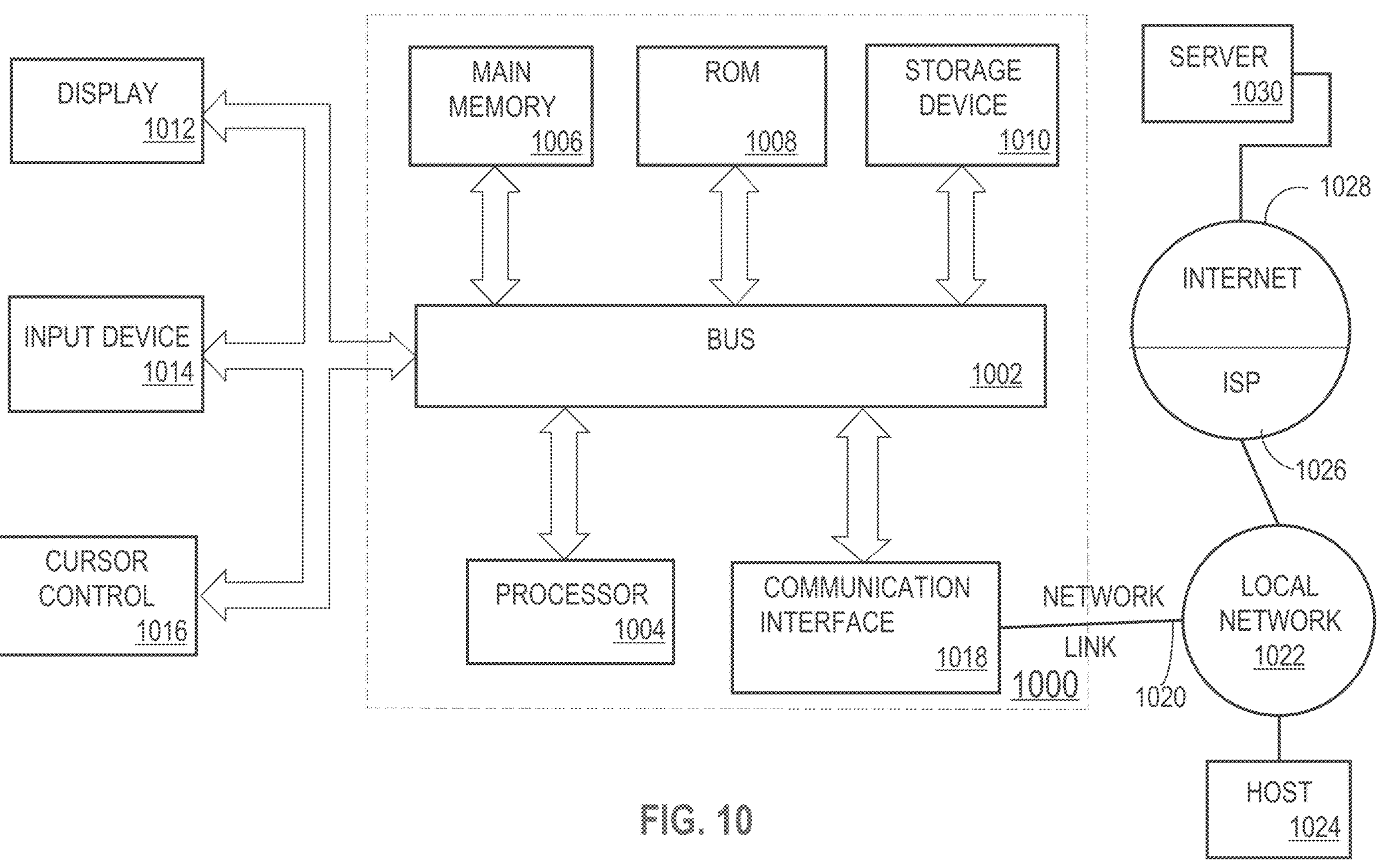
FIG. 10 illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (for example, x) and a second axis (for example, y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (for example, private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (that is, everything below the runtime execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (that is, everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:

using a server computer executing an application layer and a persistent data storage layer, importing, through the application layer, and storing in non-volatile memory, custom, user-specific business logic that is programmed to one or more business data transformation operations;

the importing of the custom, user-specific business logic comprising serializing the custom, user-specific business logic to text with one or more in-memory dependencies detected using a linting program, programmatically calling one or more network calls to send the serialized form of text associated with the custom, user-specific business logic into the application layer; encapsulating the serialized form of text with the dependencies as an instance of a functional representation type, implementing on the instance one or more security controls configured for secure sharing of the instance, and logging the importing as an auditable event; and storing the serialized form of text and any associated metadata in a repository configured as a functioning programming library with install requirements and versioning, wherein the metadata comprises at least a location of the functioning programming library, the location being configured for loading of the functioning programming library;

storing, in at least one of main memory of the server computer or, through the persistent data storage layer, a back-end database, one or more Tiles respectively corresponding to one or more data sources, each Tile being associated with a plurality of metadata including at least permissions metadata, usage metadata, and version metadata;

storing, in main memory, one or more Edges respectively corresponding to one or more data transformation operations, each Edge being associated with a plurality of metadata including at least permissions metadata, usage metadata, and version metadata;

receiving graphical input that graphically arranges, in a graphical user interface, visual representations in the graphical user interface of the one or more Tiles and the one or more Edges into a Mosaic, the Mosaic forming a directed acyclic graph, and storing the Mosaic in non-volatile memory in association with a project name;

programmatically traversing the one or more Tiles and the one or more Edges comprising the Mosaic, including executing the one or more data transformation operations, to produce a final data set, and storing the final data set in non-volatile memory associated with the project name;

at least one of the Edges that is stored in main memory being an Edge Instance of an imported business data transformation operation;

transforming one or more program objects, one or more of the Edges, and the Mosaic into a serialized form of text using a particular serialization method from among a plurality of different serialization methods based on (1) an object type of the one or more program objects, (2) one or more of the Edges, and (3) the Mosaic, including serializing the one or more of the Edges without decorators or annotations and serializing the Mosaic as a containerization configuration file.

2. The method of claim 1, the Edge Instance being associated with edge type metadata partly defined by a number of inputs accepted and a number of outputs produced by the Edge Instance.

3. The method of claim 1, at least one Edge of the Mosaic comprising a machine learning classification function;

the method further comprising traversing the one or more tiles and the one or more Edges comprising the Mosaic to produce the final data set by dividing model input data into one or more training segments and one or more test segments for executing the machine learning classification function using random sampling, rolling validation, or walk forward validation.

4. The method of claim 3, further comprising causing to display, in the graphical user interface, at least one of a validation curve, a learning curve, a calibration curve, or a precision and recall curve related to execution of the machine learning classification function, wherein the machine learning classification function comprises a random forest classifier.

5. The method of claim 1, further comprising generating Python program code by:

selecting one of a user-defined Edge comprising a user-defined data transformation operation or a user-defined Edge Queue comprising a plurality of user-defined data transformation operations;

extracting user-defined logic, in the form of Python code, from the selected user-defined Edge or user-defined Edge Queue;

packaging and storing, in memory, the user-defined logic extracted in the form of Python code in a portable and installable Python library.

6. A computer system, comprising:

one or more processors;

a memory comprising a set of instructions which when executed causes the one or more processors to execute a method, the method comprising:

using a server computer executing an application layer and a persistent data storage layer, importing, through the application layer, and storing in non-volatile memory, custom, user-specific business logic that is programmed to one or more business data transformation operations;

the importing of the custom, user-specific business logic comprising serializing the custom, user-specific business logic to text with one or more in-memory dependencies detected using a linting program, programmatically calling one or more network calls to send the serialized form of text associated with the custom, user-specific business logic into the application layer; encapsulating the serialized form of text with the dependencies as an instance of a functional representation type, implementing on the instance one or more security controls configured for secure sharing of the instance, and logging the importing as an auditable event; and storing the serialized form of text and any associated metadata in a repository configured as a functioning programming library with install requirements and versioning, wherein the metadata comprises at least a location of the functioning programming library, the location being configured for loading of the functioning programming library;

storing, in at least one of main memory of the server computer or, through the persistent data storage layer, a back-end database, one or more Tiles respectively corresponding to one or more data sources, each Tile being associated with a plurality of metadata including at least permissions metadata, usage metadata, and version metadata;

storing, in main memory, one or more Edges respectively corresponding to one or more data transformation operations, each Edge being associated with a plurality of metadata including at least permissions metadata, usage metadata, and version metadata;

receiving graphical input that graphically arranges, in a graphical user interface, visual representations in the graphical user interface of the one or more Tiles and the one or more Edges into a Mosaic, the Mosaic forming a directed acyclic graph, and storing the Mosaic in non-volatile memory in association with a project name;

programmatically traversing the one or more Tiles and the one or more Edges comprising the Mosaic, including executing the one or more data transformation operations, to produce a final data set, and storing the final data set in non-volatile memory associated with the project name;

at least one of the Edges that is stored in main memory being an Edge Instance of an imported business data transformation operation;

transforming one or more program objects, one or more of the Edges, and the Mosaic into a serialized form of text using a particular serialization method from among a plurality of different serialization methods based on (1) an object type of the one or more program objects, (2) one or more of the Edges, and (3) the Mosaic, including serializing the one or more of the Edges without decorators or annotations and serializing the Mosaic as a containerization configuration file.

7. The computer system of claim 6, at least one Edge of the Mosaic comprising a machine learning classification function;

the method further comprising traversing the one or more tiles and the one or more Edges comprising the Mosaic to produce the final data set by dividing model input data into one or more training segments and one or more test segments for executing the machine learning classification function using random sampling, rolling validation, or walk forward validation.

8. The computer system of claim 7, the method further comprising causing to display, in the graphical user interface, at least one of a validation curve, a learning curve, a calibration curve, or a precision and recall curve related to execution of the machine learning classification function, wherein the machine learning classification function comprises a random forest classifier.

9. The computer system of claim 6, the method further comprising generating program code in Python by:

selecting one of a user-defined Edge comprising a user-defined data transformation operation or a user-defined Edge Queue comprising a plurality of user-defined data transformation operations;

extracting user-defined logic, in the form of Python code, from the selected user-defined Edge or user-defined Edge Queue;

packaging and storing, in memory, the user-defined logic extracted in the form of Python code in a portable and installable Python library.

10. A computer-implemented auto-packaging of user-defined function method, using a server computer, comprising:

automatically extracting a user-defined function written in a development environment;

selecting one of a user defined Edge comprising a user-defined data transformation operation or a user-defined Edge Queue comprising a plurality of user-defined data transformation operations;

serializing the user-defined function along with any dependencies detected using a linting program to a string/textual data;

encapsulating the string/textual data along with any dependencies as an instance of a functional representation;

implementing one or more security controls on the instance, wherein the security controls are configured for secure sharing of the instance;

logging the extracting of the user-defined function as an auditable event;

instantiating an installable package from a portable and installable library based on the serialized form of string/textual data of the user-defined function along with any dependencies;

writing, in the portable and installable library, the serialized form of string/textual data of the user-defined function;

transforming (1) one or more program objects, and (2) the selected user-defined Edge or the selected user-defined Edge Queue into a serialized form of text using a particular serialization method from among a plurality of different serialization methods based on (1) an object type of the one or more program objects, and (2) the selected user-defined Edge or the selected user-defined Edge Queue.

11. The method of claim 10, wherein the user-defined function, the installable package, and the portable and installable library comprise PYTHON computer program code.

12. The method of claim 10, further comprising automatically packaging the user-defined function in a human-readable language capable of interpretation or compilation, as part of automated library composition.

13. The method of claim 10, further comprising automatically packaging the user-defined function in PYTHON as part of automated library composition.

14. The method of claim 10, the installable package in the portable and installable library comprising an auto-generated installation file that allows for the installable package to be installed into an arbitrary environment.

* * * * *